United States Patent [19]
Feng et al.

[11] Patent Number: 6,046,828
[45] Date of Patent: *Apr. 4, 2000

[54] METHOD AND SYSTEM FOR AUTOMATICALLY DETECTING AN EDGE AND WIDTH OF A DOCUMENT UTILIZING A SCANNING SYSTEM

[75] Inventors: Xiao-fan Feng, Webster; John C. Handley, Fairport, both of N.Y.

[73] Assignee: Xerox Corporation, Stamford, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/814,050

[22] Filed: Mar. 6, 1997

[51] Int. Cl.$^7$ .............................. H04N 1/04; H04N 1/40; G06K 9/48

[52] U.S. Cl. ........................ 358/488; 358/449; 382/199

[58] Field of Search ..................................... 358/449, 488; 382/199, 224, 225, 228, 168, 171, 172, 194, 271

[56] References Cited

U.S. PATENT DOCUMENTS 5,133,022   7/1992   Weideman .............................. 382/172
5,198,853   3/1993   Ichihara et al. ......................... 355/244

*Primary Examiner*—Leo H. Boudreau
*Assistant Examiner*—Dmitoy A. Novik
*Attorney, Agent, or Firm*—Micahel J. Nickerson

[57] ABSTRACT

A method and system automatically determines the width (i.e., left and right edges) of a document when it is loaded for scanning or copying. When a document is staged, the scanner collects a predetermined number scanlines of the leadedge of the document. Both first order and second order statistics of the scanner and document are then calculated based on the scanned data. The auto-width detection process is adaptive to CCD sensor output variation, document variation, and scanner variation, thus making it robust against dust in the sensor path and random fluctuations of the scanner.

12 Claims, 13 Drawing Sheets

METHOD AND SYSTEM FOR AUTOMATICALLY DETECTING AN EDGE AND WIDTH OF A DOCUMENT UTILIZING A SCANNING SYSTEM

FIELD OF THE PRESENT INVENTION

The present invention is directed to a system and method for automatically detecting the width and edge of a document being scanned by a scanning system. More particularly, the present invention is directed to a method and system for detecting the edge and width of a document being scanned utilizing values calculated from a second order function.

BACKGROUND OF THE PRESENT INVENTION

Traditionally, copier, in the office equipment context, refers to light lens xerographic copiers in which paper originals are in fact photographed. The images are focused on an area of a photoreceptor, which is subsequently developed with toner. The developed image on the photoreceptor is then transferred to a copy sheet which in turn is used to create a permanent copy of the original.

In recent years, there has been made available what is known as digital copiers. And the most basic functions, a digital copier performs the same functions as a light lens copier, except that the original image to be copied is not directly focused on a photoreceptor. Instead, with a digital copier, the original image is scanned by a device generally known as a raster input scanner (RIS) which is typically in the form of the linear array of small photosensors.

The original image is focused on the photosensors in the RIS. The RIS converts the various light and dark areas of the original image to a set of digital signals. These digital signals are temporarily retained in a memory and then eventually used to operate a digital printing apparatus when it is desired to print copies of the original or a display screen when it is desired to display the image; i.e., the image is scanned and converted to electrical signals so that the image can be used for other reproduction purposes. The digital signals may also be sent directly to the printing device or display device without being stored in a memory. The digital printing apparatus can be any known type of printing system responsive to digital data, such as a modulating scanning laser which discharges image wide portions of a photoreceptor, or an ink jet printhead.

With the migration of the copying and scanning systems to a digital base system, the systems face different problems than from the light lens or analog copying systems. More specifically, in a digital scanning system, the scanning system needs to locate the actual location of the document so that any desired image processing routines can be applied to the correct pixels of image data.

In describing the present invention, the terms pixel will be utilized. This term may refer to an electrical (or optical, if fiber optics are used) signal which represent the physically measurable optical properties at a physically definable area on a receiving medium. The receiving medium can be any tangible document, photoreceptor, or marking material transfer medium. Moreover, the term pixel may refer to an electrical (or optical, if fiber optics are used) signal which represent the physically measurable optical properties at a physically definable area on a display medium. A plurality of the physically definable areas for both situations represent the physically measurable optical properties of the entire physical image to be rendered by either a material marking device, electrical or magnetic marking device, or optical display device.

Lastly, the term pixel may refer to an electrical (or optical, if fiber optics are used) signal which represents physical optical property data generated from a single photosensor cell when scanning a physical image so as to convert the physical optical properties of the physical image to an electronic or electrical representation. In other words, in this situation, a pixel is an electrical (or optical) representation of the physical optical properties of a physical image measured at a physically definable area on an optical sensor.

In a digital scanning system, it is desirable to perform the image processing routines only upon the image of the document and not upon the image data representing the backing of the platen cover in a platen scanning system or the backing roll in a document feeding system, such a constant velocity transport ("CVT") system. In this application, the term backing roll or backing will be used to describe the area scanned by the digital scanner which is not the document or desired image to be scanned.

Thus, it is important in a digital scanning system to determine the actual location of the document being scanned; i.e., the document's edges and document's width. This locating of the document is particularly important in an engineering document scanning system.

In an engineering document scanning system, the input document can be of any size ranging from 5 inches to more than 36 inches. Conventionally, in one method of determining the location of the document, a user would manually determine the document size and input the width, through a user interface, to the document scanning system before the document was actually scanned. In this conventional method, the document must be centered in the document scanning system to avoid the document image from being clipped.

This conventional manual method reduces productivity and causes wasted copies since a user cannot always input the correct width or center the document accurately in the document scanning. Thus, it would be desirable to have an auto-width detection system to determine the document's width and position when the document is being initially staged for scanning.

Various auto-width detection schemes have been proposed so as to determine the document's width and position when the document is staged; however, these detection methods have not been completely successful because the documents to be scanned in an engineering environment can be very similar to the backing, thus making it difficult to distinguish between the paper and the backing (backing roll or the backing of the platen cover).

This problem is accentuated when the scanner CCD sensor output fluctuates. Moreover, it is possible that a document and scanner can interact to produce an integrating cavity effect which will mask the edge location of the document.

One such conventional auto-width detection method captures a portion of the lead edge of a document that is staged wherein the captured portion of the lead edge includes both image data related to the backing and the document itself. In this automated process, the width and position of a document is calculated by determining whether each CCD sensor element is covered by a backing or document.

In other words, the width detection process becomes a classification process. Each CCD sensor element is either covered by the backing or document. To make this determination, the conventional automatic detection method utilizes the mean of each column of pixels of image data to differentiate between the document and the backing. Examples of this mean data are illustrated in FIGS. 3 and 5 of the present application.

However, since the document's brightness varies from very dark to very bright and since most bond paper and film documents have about the same brightness as the backing, the conventional auto-width detection process often fails to detect the actual location and width of the document. Moreover, since the conventional method relies solely on determining the location and width of the document from mean data, which corresponds to a first order function. The mean data is very susceptible to electrical noise within the CCD sensors or dust and dirt within the actual scanning system. In other words, any excessive electric noise, dust, or dirt could readily render the conventional auto-width detection process ineffective.

In addition to being sensitive to electrical noise, dust, and dirt, the conventional auto-width detection process requires a very sensitive filtering routine to detect the transition from the backing roll to the document, the document's edge. This can be seen in FIGS. 3 and 5 of the present application wherein the transitions from the backing to the document (at about pixel numbers 510 and 245, respectively) are represented by a very narrow pulse spike. Thus, the conventional process requires a very sensitive filtering routine to detect this transition which in turn makes the detection process very sensitive to electrical noise, dust, or dirt.

Therefore, it is desirable to have an automatic detection routine which can accurately detect the location and width of the document being scanned without being sensitive to electrical noise, dust, and/or dirt.

The present invention proposes a method and system for providing automatic detection of the width and position of a document which is substantially insensitive to dust and dirt as well as electrical noise wherein the present invention utilizes second order statistics, such as a standard deviation, in addition to the mean information to determine the actual edges of the document. By utilizing second order statistics, the transition between the backing and the document can be more readily found without the use of sensitive filtering routines.

SUMMARY OF THE PRESENT INVENTION

One aspect of the present invention is a method for automatically detecting an edge of a document in a scanning system. This method scans a portion of the document, generates pixels of image data representing an image density, calculates a set of first values from the image data using a first order function, calculates a set of second values from the image data using a second order function, and determines a physical edge of the document from the set of first values and a set of second values.

Another aspect of the present invention is a system for automatically detecting an edge of a document in a scanning system. The system includes a scanner to scan a portion of the document and to generate pixels of image data representing an image density; first means for calculating a set of first values from the image data using a first order function; second means for calculating a set of second values from the image data using a second order function; and third means for determining a physical edge of the document from the set of first values and the set of second values.

Further objects and advantages of the present invention will become apparent from the following descriptions of the various embodiments and characteristic features of the present invention.

BRIEF DESCRIPTION OF THE DRAWINGS

The following is a brief description of each drawing used to describe the present invention, and thus, are being presented for illustration purposes only and should not be limitative of the scope of the present invention, wherein.

DETAILED DESCRIPTION OF THE PRESENT INVENTION

The following is a detailed description of the present invention. In this description and in the Figures, like reference numbers represent equivalent circuits and/or equivalent functions.

Figure 1:
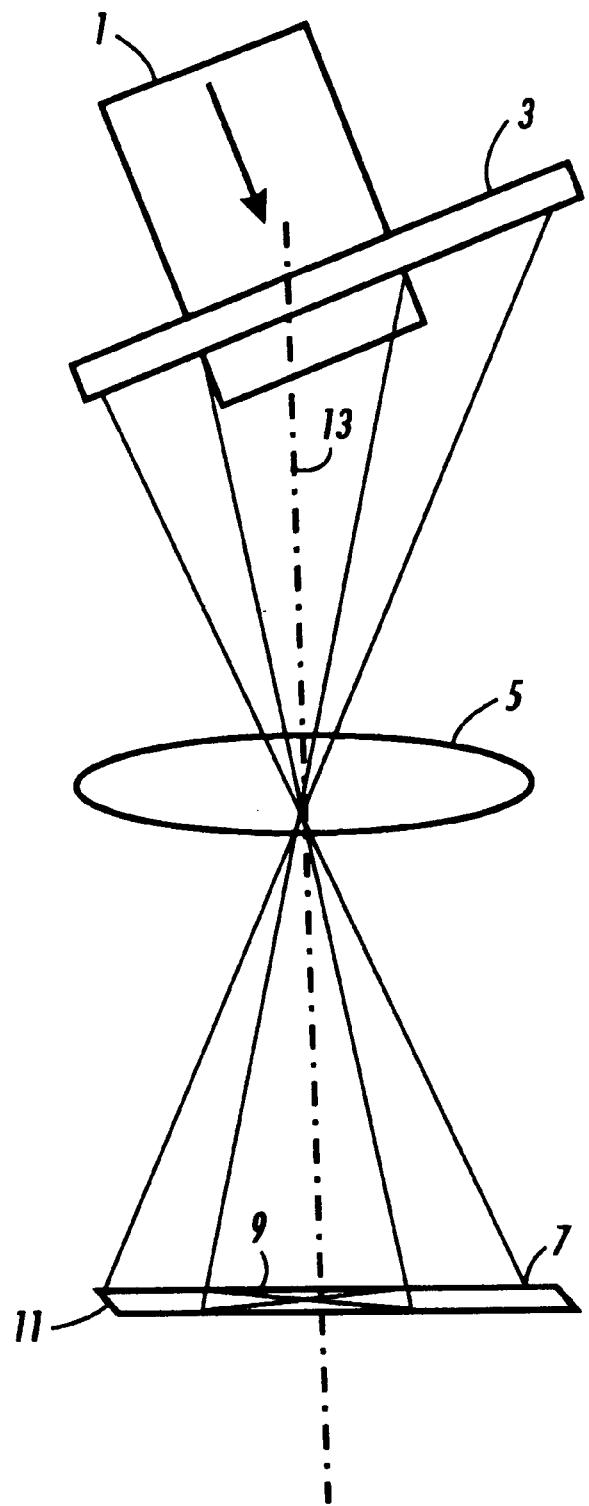
FIG. 1 is a schematic of a typical digital scanning system.

As noted above, FIG. 1 is a schematic of a typical digital scanning system. As illustrated in FIG. 1, a document 1 is scanned by a CCD sensor 7. In the particular system illustrated in FIG. 1, the document 1 is moved past the CCD sensor 7 through the use of a backing roll 3. The light reflected from the document 1 and the backing roll 3 passes through a lens system 5 which focuses the reflected light upon the CCD sensor 7. The reflected light is focused with respect to an optical center line 13. The reflected image of the document 9 is converted by the CCD sensor 7 into pixels of image data as well as the reflected image of the backing roll 11. Thus, the CCD sensor 7 produces pixels of image data which represent both the reflected image of the backing roll 11 and the reflected image of the document 9.

Figure 2:
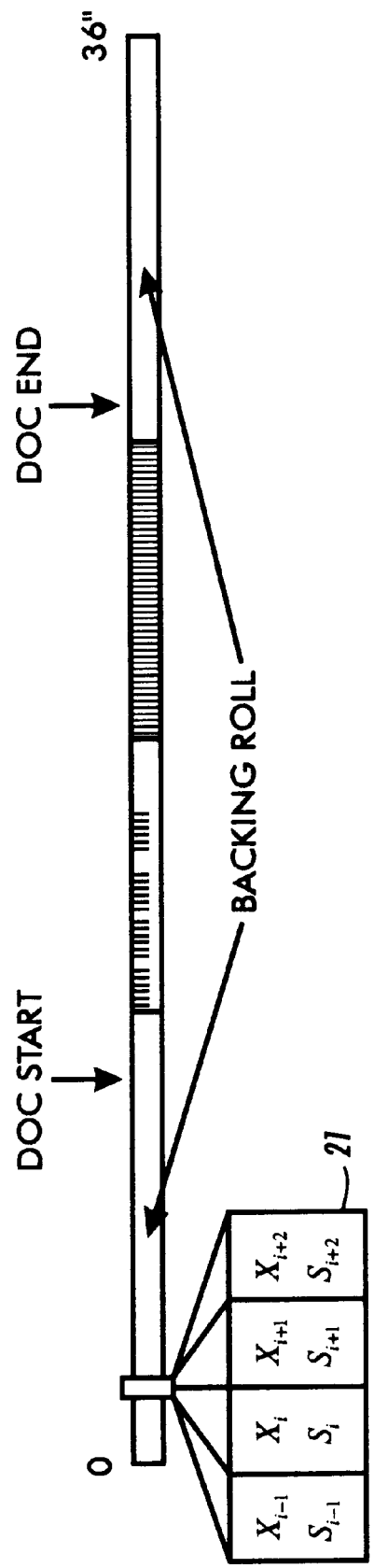
FIG. 2 illustrates a typical leadedge image captured during document staging.

FIG. 2 illustrates a typical leadedge image captured during document staging. As illustrated in FIG. 2, the leadedge of the image is captured wherein the image data represents both the reflected image of the backing and the actual document. In the example illustrated in FIG. 2, the CCD sensor scans a width of 36 inches.

If the resolution of the CCD sensor is 200 dots per inch, the digital scanning system will produce 7200 pixels of image data per scanline. Each pixel of image data is then assigned a pixel location number from 1 to 7200 in a left to right orientation and a pixel location number from 1 to 7200 in a right to left orientation. These pixel location numbers then form columns of image data as more than one scanline of the leadedge image are captured during the document staging mode. For example, if the scanned leadedge is 25 scanlines, a pixel location number would be a column of 25 pixels wherein the image data of each of these pixels would have been created by the same photosite on the CCD.

An example of these columns of image data is illustrated by reference numeral 21 in FIG. 2. More specifically, a block 21 of columns is illustrated wherein the mean value and the standard deviation of each column is shown. More specifically, for example, for pixel location associated with column i, the mean value is $X_i$ and the standard deviation value is $S_i$, while the pixel location associated with column i+1, the mean value is $X_{i+1}$ and the standard deviation value is $S_{i+1}$. These mean and standard deviation values associated with each column are utilized by the present invention in determining the actual edges and width of the document to be scanned.

Figure 3:
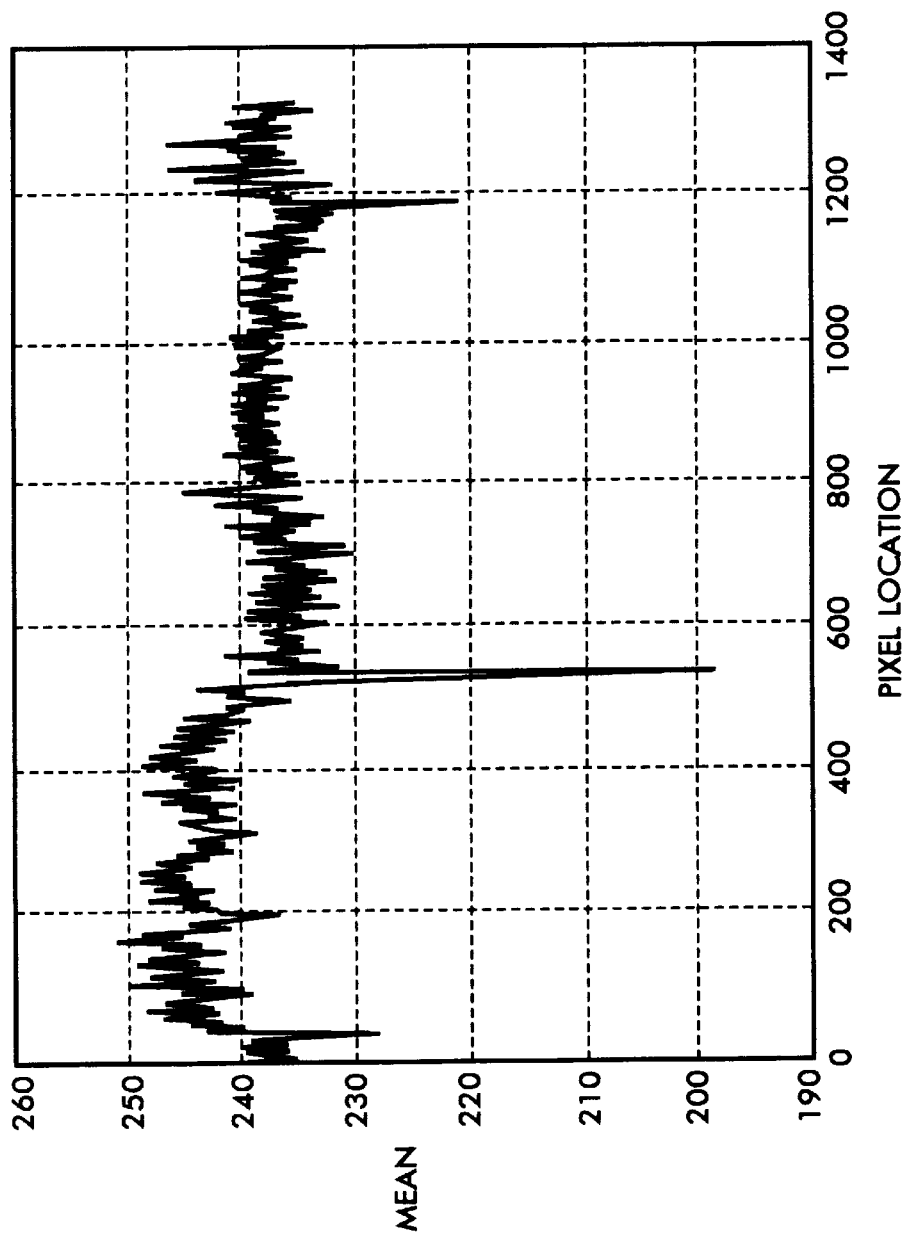
FIG. 3 is a graph illustrating mean data at a right edge of a document during document staging.
Figure 4:
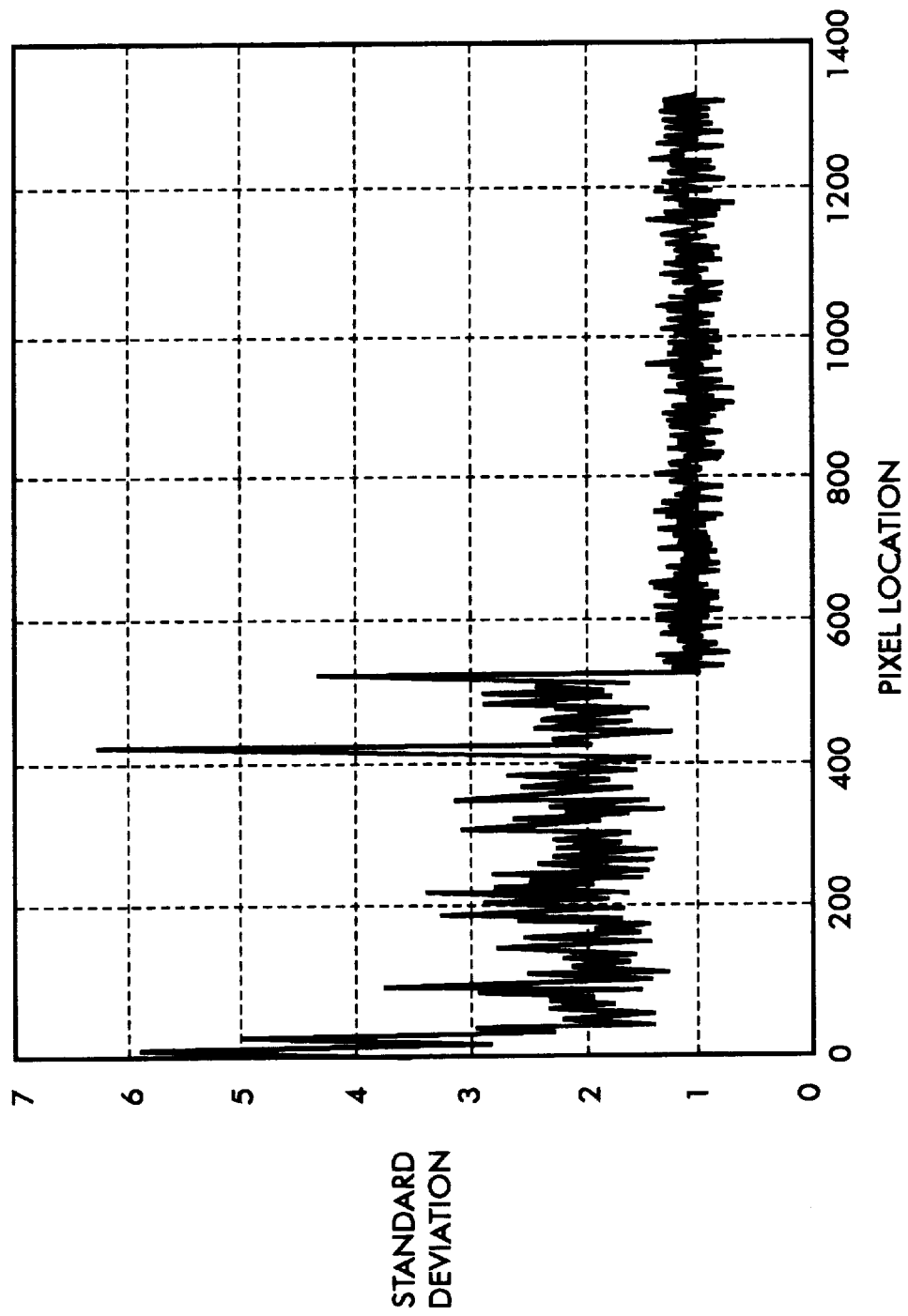
FIG. 4 is a graph illustrating standard deviation data at a right edge of a document during document staging.
Figure 5:
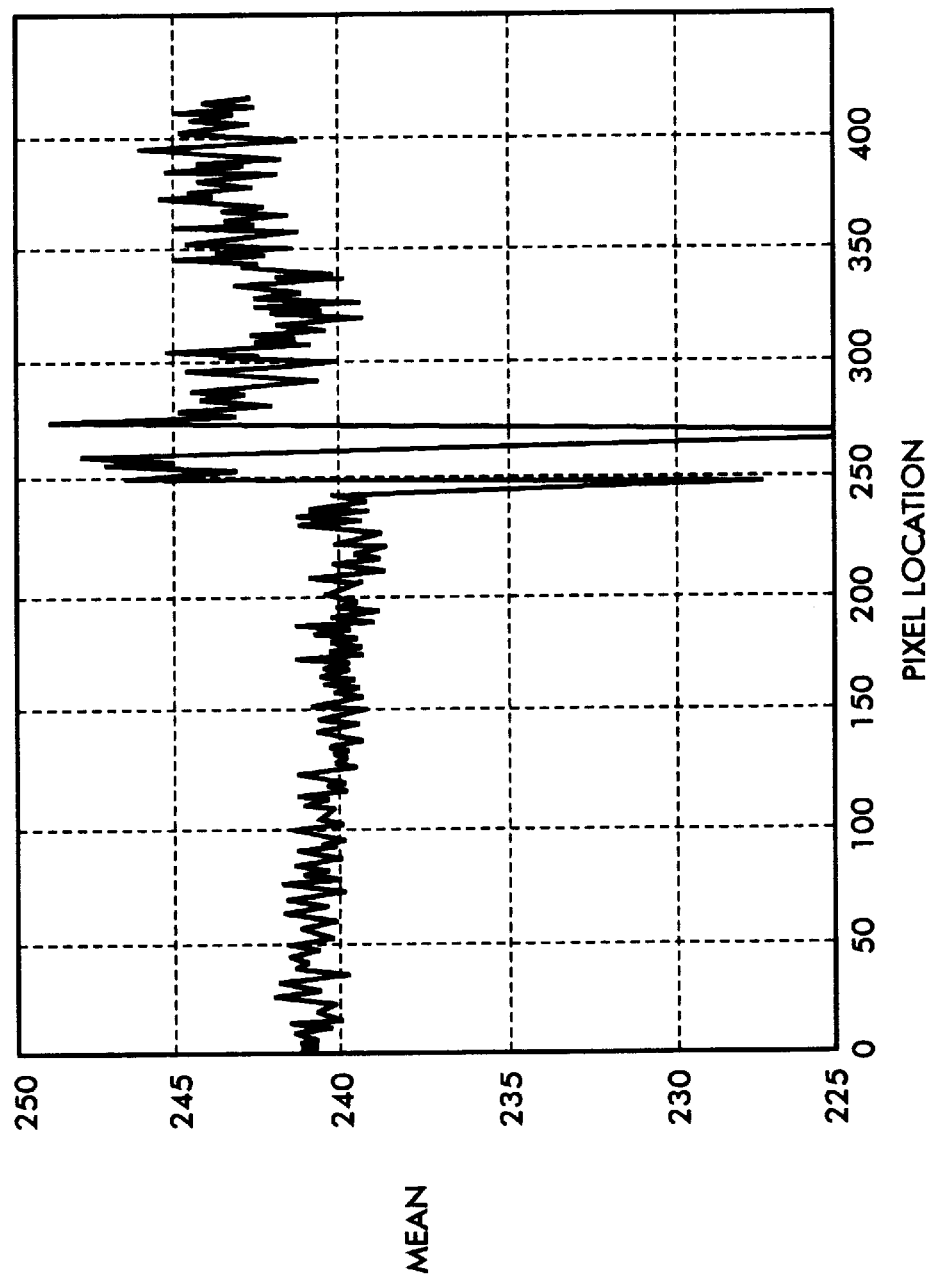
FIG. 5 is a graph illustrating mean data at a left edge of a document during document staging.
Figure 6:
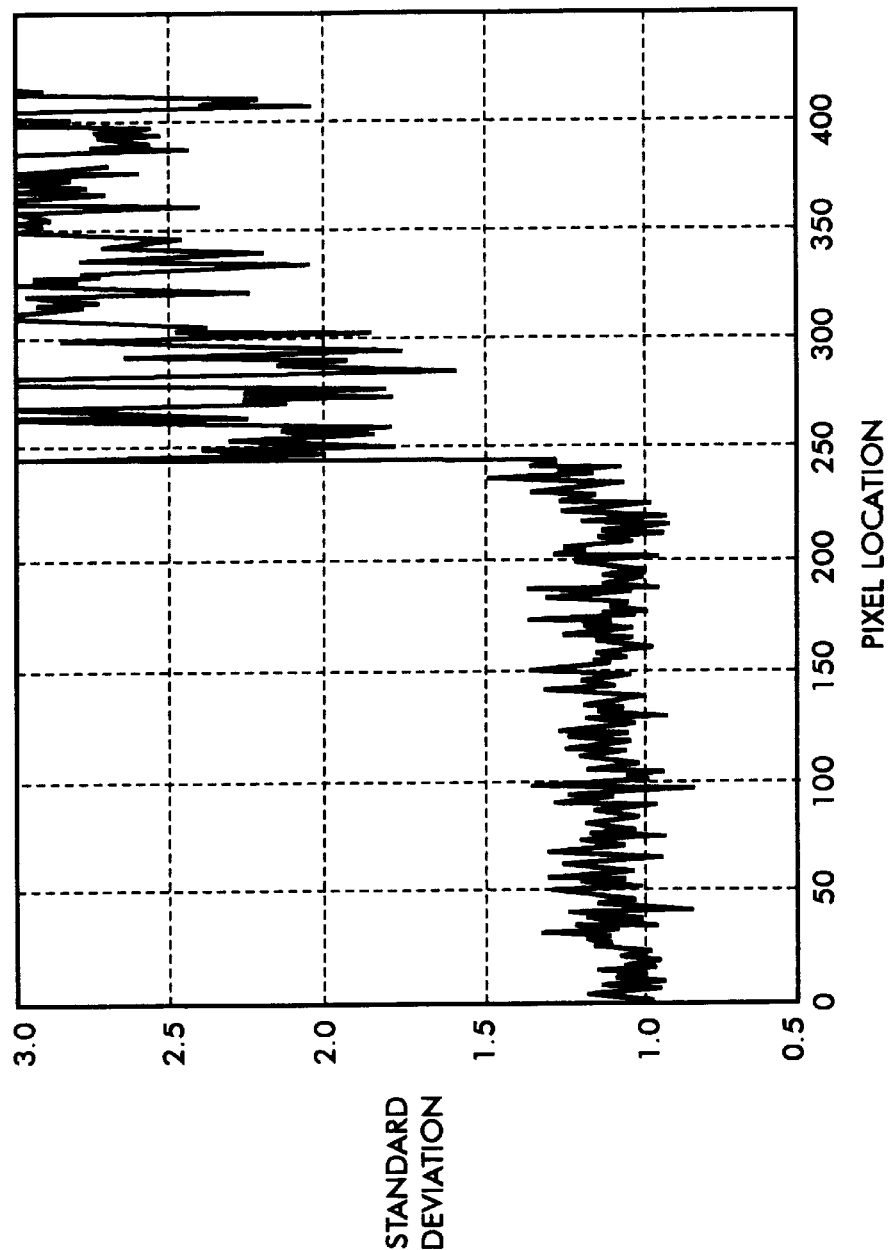
FIG. 6 is a graph illustrating standard deviation data at a left edge of a document during document staging.

Further examples of this column-formatted data is illustrated in FIGS. 3–6. More specifically, as noted above, FIG. 3 illustrates the mean values for the pixel locations between pixel 0 and pixel 1200 when scanning from a right to left direction (from backing to document), while FIG. 5 illustrates the mean value for each pixel location from pixel number 0 to pixel number 400 when scanning from a left to right direction. On the other hand, FIG. 4 illustrates the standard deviation value for the pixel locations between pixel number 0 and pixel number 1200 when scanning from a right to left direction, while FIG. 6 illustrates the standard deviation value for each pixel location from pixel number 0 to pixel number 400 when scanning from a left to right direction. In other words, FIGS. 3 and 4 correspond to reading the pixels of image data in a right to left manner while FIGS. 5 and 6 illustrate the reading of data associated with pixel locations in a left to right manner.

As is illustrated in FIGS. 3 and 5, it is difficult to detect the left and right edges of a document utilizing only the mean data because many sources can significantly contribute to the variation seen in the data. More specifically, although the backing has a constant reflectance, the linear CCD has varying response due to element to element variations (photosites on a CCD sensor or photosensor chips in a full width array), optics, and system (electrical) noise. Moreover, dust particles can appear in the image as vertical dark streaks and the documents themselves can vary tremendously due to their texture and fiber content. Lastly, as noted above, some document types such as film and bond paper have reflectance values similar to the backing.

Other sources of variation can be dark documents which cause a reflectance radiance to form near the document's edges, thereby causing the edges to appear as ramps, while dust particles cause various jumps that appear similar to the edge of a film or bond paper. The element to element variation in the CCD sensor or full width array along with system noise can cause reflectance variations that may mask edges. In other words, these various sources of variation cause the detecting of the left and right document edges to become very difficult when solely relying upon mean data.

On the other hand, as illustrated in FIGS. 4 and 6, second order values such as a standard deviation values are utilized in addition to the mean values. By utilizing these second values, values generated from a second order function, the sensitivity to the various sources of variation can be significantly reduced due to the wide gap between the standard deviation for the document and the standard deviation for the backing.

More specifically, for the CCD elements which are covered by the backing, the standard deviation is the sensor electronic noise since the backing is stationary during the scan. However, for the elements of the CCD sensor which are covered by the document, since the document moves during the scanning at document staging, the standard deviation consists of sensor electronic noise plus the document brightness variation. Typically, the document brightness variation is much larger than the sensor electronic noise, and thus, the standard deviation value provides a clean and significant gap when there is a transition from the backing to the document itself.

Moreover, the standard deviation value is more robust against dirt or dust on the backing. A dust or dirt particle on the backing will significantly reduce the mean value, but the sensor noise is still the same because it sees the same spot during the scan. In other words, the mean difference between the backing and the document can be masked by sensor noise and/or dust or dirt on the backing, while the standard deviation difference is clearly visible and well separated since these values are not significantly sensitive to electronic noise or dust and dirt.

In the preferred embodiment of the present invention, the signal-to-noise ratio is further enhanced by lowpass filtering done in the scanner. The image obtained from the scanner, for example, can be scanned at 400 spi and averaged over a 4-pixel-wide window on each scanline to produce a 100-spi image. The effect is to low-pass filter the image. On the backing roll, where the reflectance is independent and identically normally distributed, the variance of scanner noise is reduced by ½. But the paper noise has an approximate $1/f^2$ power spectrum. Low-pass filtering (averaging) has little effect. This increases the signal-to-noise ratio between the document and backing roll.

Figure 11:
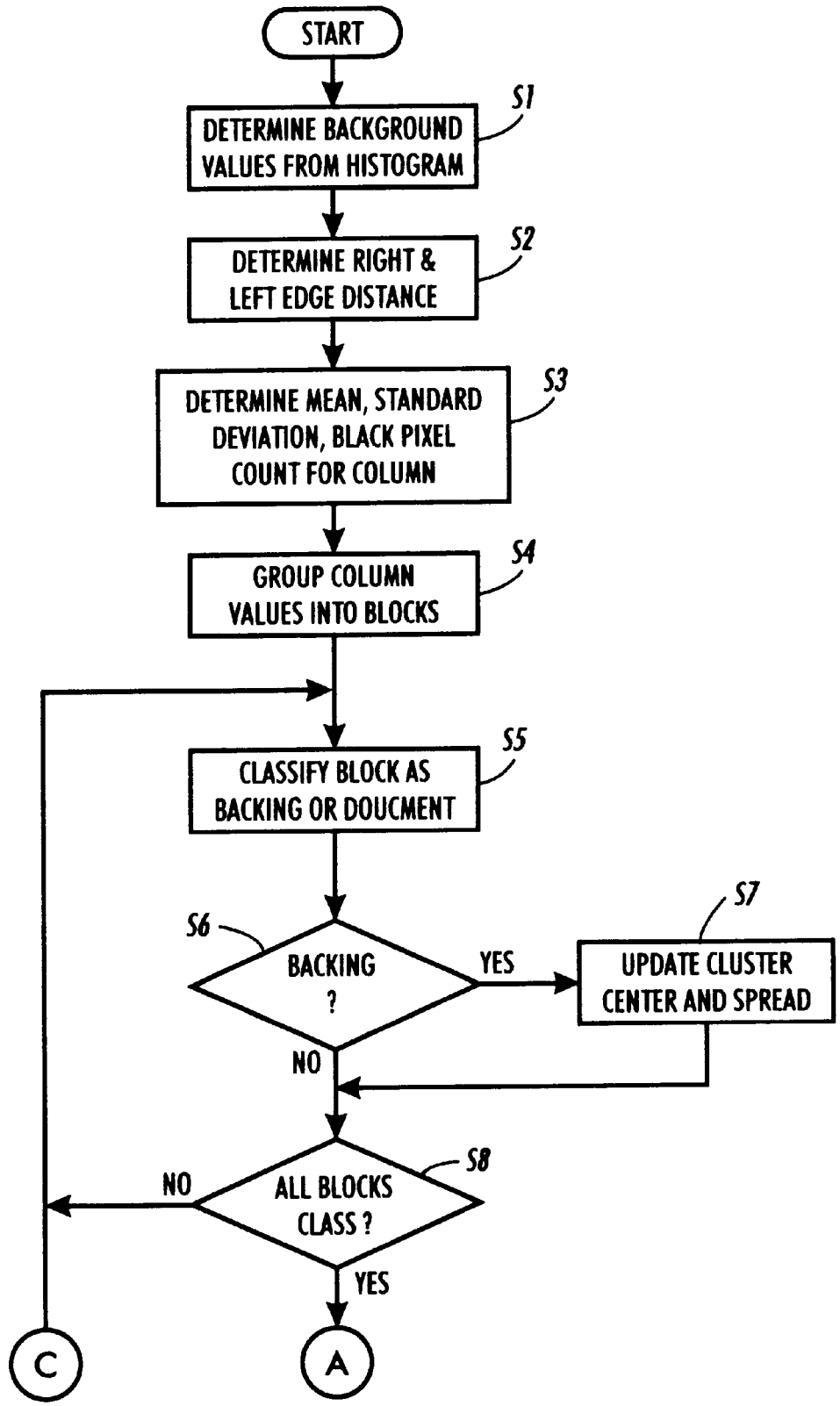
FIGS. 11 and 12 are flowcharts illustrating a method for automatically detecting a width and position of a document according to the concepts of the present invention.
Figure 12:
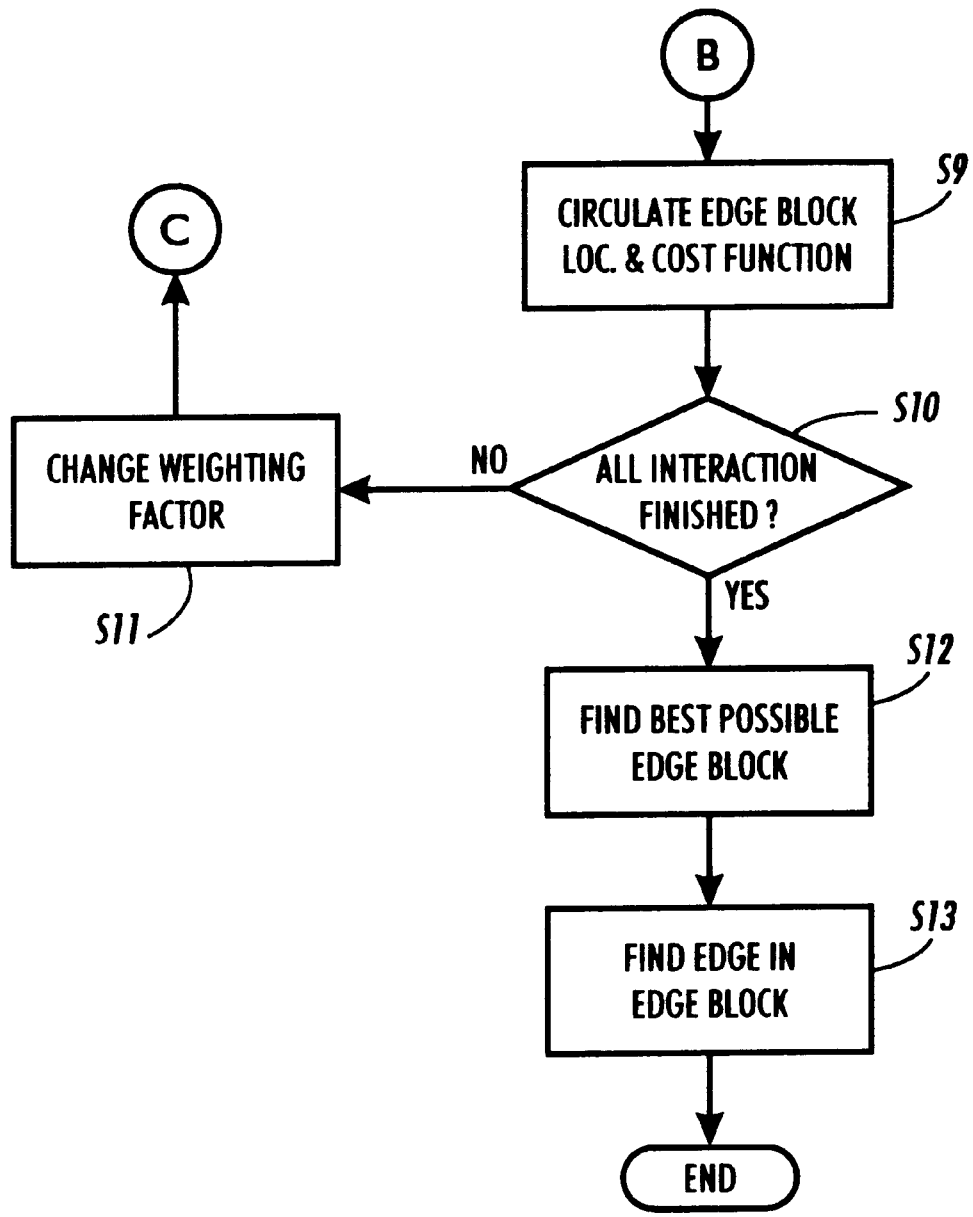

In view of the robustness of the standard deviation values, the present invention utilizes a method as illustrated in FIGS. 11 and 12 to determine the edges of the document wherein this method calculates the edges of the document from the mean value, standard deviation values and black pixel count values for each column of pixels of image data. As illustrated in FIG. 11, step S1 determines the background values from a histogram of the leadedge image of the document during document staging.

Figure 9:
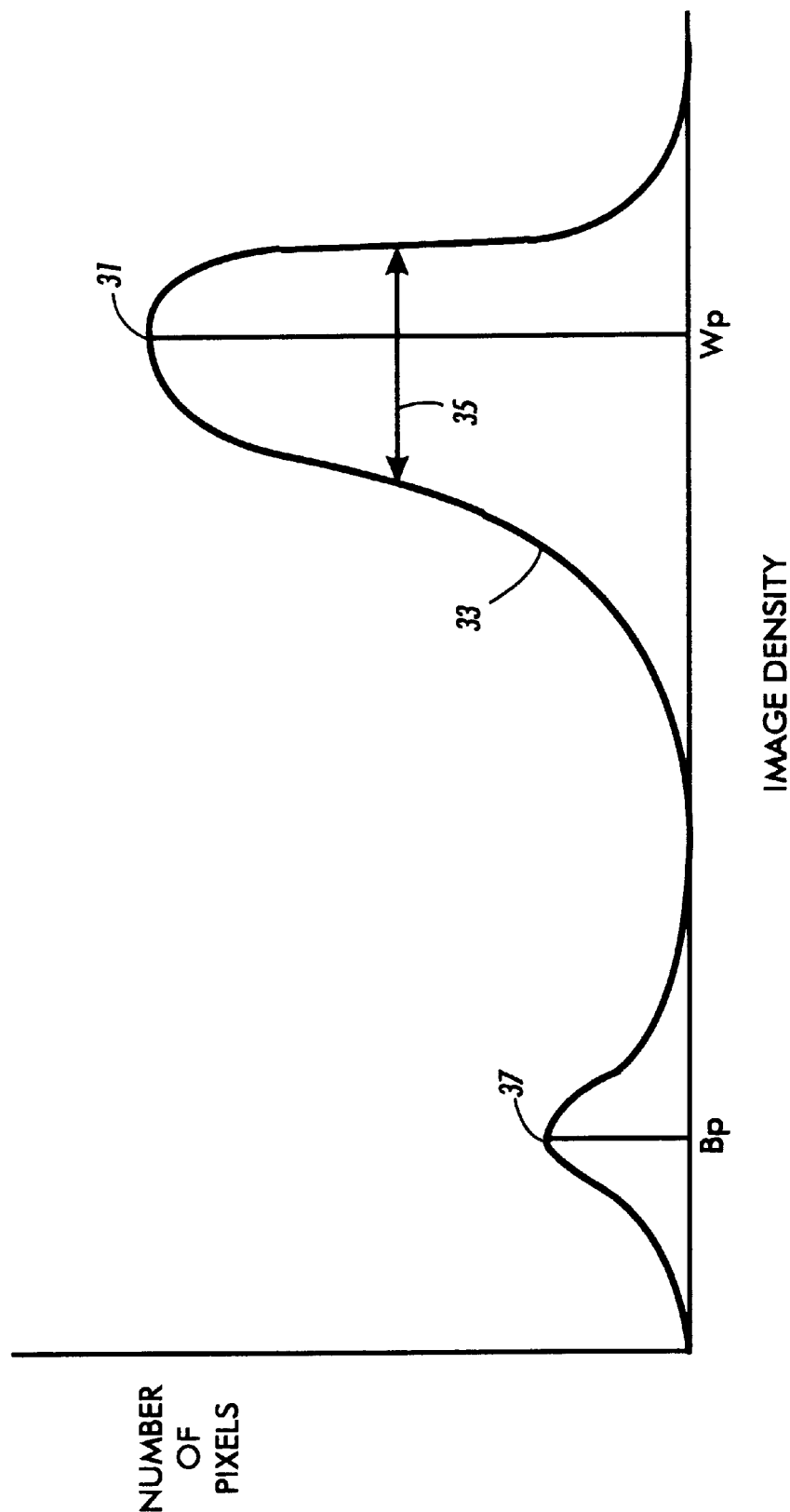
FIG. 9 is a graphical representation of a typical histogram of a document.

A typical histogram for an image is illustrated in FIG. 9 wherein the histogram 33 typically includes two separate peaks 31 and 37. Peak 31 represents the white peak value or document background value, while peak 37 represents the black peak value. These peak values, along with a width value 35 of the distribution of the white peak value, are utilized to determine a threshold values which will be utilized in determining whether a pixel is black or white, and whether the document covers the ends of the scanner.

After determining the background values from the histogram, step S2 determines the right and left edge distance. In the preferred embodiment of the present invention, the distance for the left edge is calculated using the following equation:

$$\text{DistLft}=\text{sqrt}([(\text{LocMean}-\text{LeftMean})/\text{MEANTOL}]^2+[(\text{LocStd}-\text{STDTHD})/(\text{Wstd}*\text{STDTOL})]^2)$$

wherein LocMean is the mean of 8 column means on the left end of the CCD sensor, LocStd is the mean of 8 column standard deviations on the left end of the CCD sensor, LeftMean is scanner response to the backing roll, MEANTOL, STDTHD, and STDTOL are preset values, Wstd is the standard deviation weighting factor. In the preferred embodiment, Wstd=4 for dark substrate, and 2 for other documents. The right edge distance (DistRgt) is calculated using a similar equation with all the values being reflected onto the right side of the scanner device.

After completing step S2, the process determines the mean value, standard deviation value, and black pixel count value for each column of pixels associated with a single pixel location. More specifically, if the leadedge of a document scanned during the document staging contains 30 scanlines, the column of pixels for pixel location 50, for example, would contain 30 pixels of image data wherein each pixel of image data was produced by the same unit photocell of the CCD.

Once these values are calculated, step S4 groups the values for adjacent columns into blocks, in the preferred embodiment of the present invention, the block contains 5 columns of mean values, standard deviation values, and black pixel count values. After grouping the columns of pixel values into blocks, step S5 analyzes each block of data and classifies the block as either backing or document. If it is determined at step S6 that the block was classified as backing, step S7 updates the cluster center value and spread value which are functions of the mean value and standard deviation value of the blocks which have been analyzed. The actual calculations for these values will be discussed in more detail below.

Figure 7:
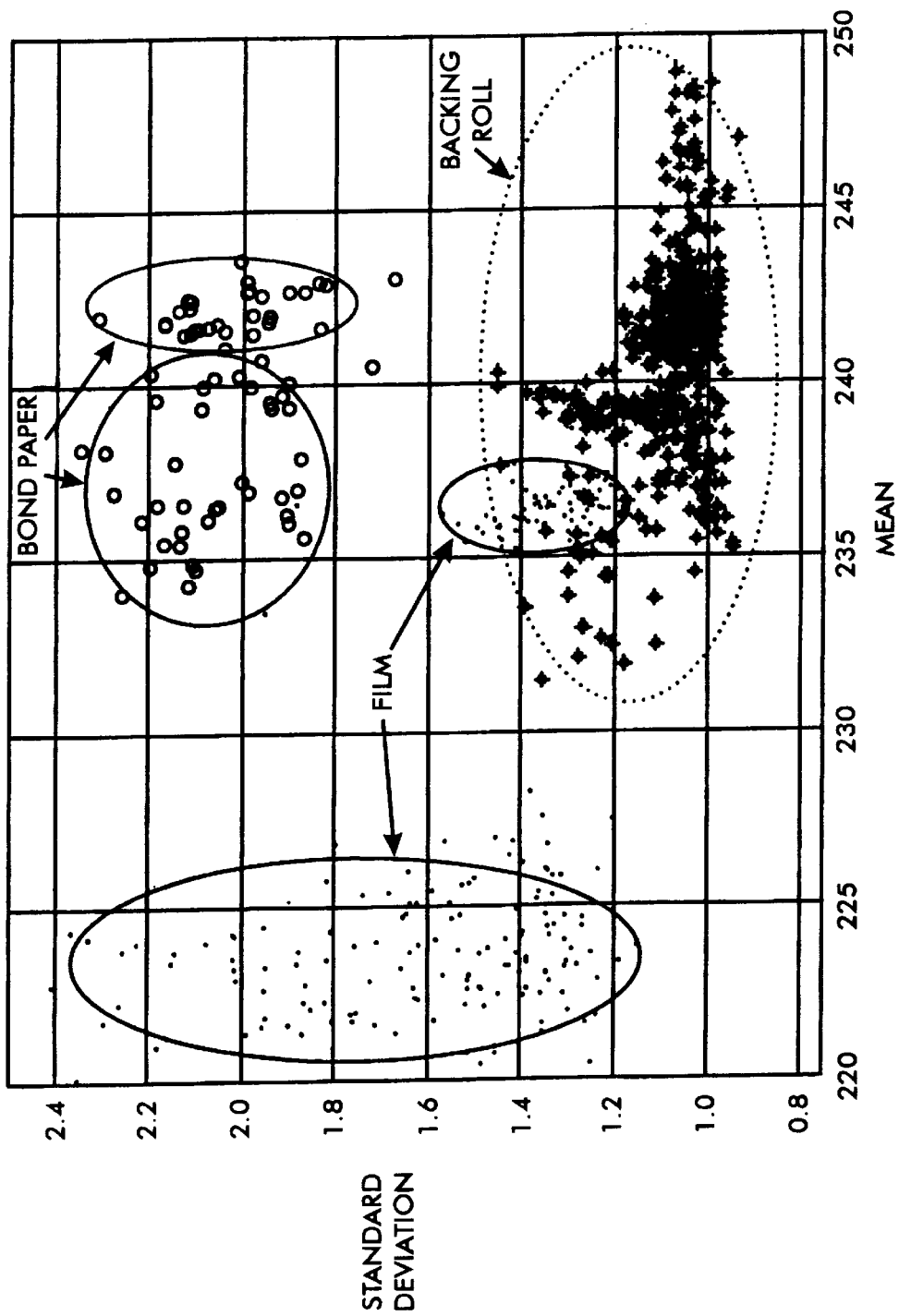
FIG. 7 illustrates the center clusters and spread of various documents and backing measurements according to the concepts of the present invention.

Once all the blocks have been classified as either backing or document, step S9 calculates which block would most likely contain an edge location as well as determines the cost function or associated confidence factor which indicates a confidence level that the block does contain the edge of the document. The edge location is calculated utilizing an adaptive Euclidean distance formula:

$$d_i^2 = [(locmean[i-1] - avgmean[i])/(k\_factor)stddevmean[i-1]]^2 +$$
$$[(locstd[i-1] - avgstd[i])/(k\_factor)stddevstd[i-1]]^2$$

wherein:

$locmean[i] = (a)locmean[i-1] + (1-(a))(X[i] - locmean[i-1]);$ $avgmean[i] = X[i];$ $stddevmean[i] = (a)stddevmean[i-1] + (1-(a))(X[i] - locmean[i]);$ $locstd[i] = (z)locstd[i-1] + (1-(z))(S[i] - locstd[i-1]);$ $avgstd[i] = S[i];$ and $stdavgstd[i] = (z)stdavgstd[i-1] + (1-(z))(S[i] - locstd[i-1]).$ It is noted that the coefficients (a) and (z) are set according to an estimated document type which is determined utilizing the histogram peaks and spread of the histogram around the white peak as illustrated in FIG. 9. Moreover, it is noted that the average mean value (avgmean[i]) and the average standard deviation (avgstd[i]) are the cluster center coordinates for the backing (FIG. 7). The standard deviation of the mean (stddevmean[i-1]) and the standard deviation of the standard deviation (stddevstd[i-1]) provide the measure of the spread of the backing. Both the cluster center and the spread are dependent upon the scanner calibration, document brightness (integrated cavity effect), and scanner noise. Therefore, these values must be adaptable from scan to scan and from edge of the scanner to the document edge.

The calculation of the block having a possible edge location and cost function is carried out a predetermined number of times wherein each iteration of the calculation uses less stringent criteria and competence coefficients to determine whether an edge appears within a block. In other words, in each iteration of the calculation for the edge block location and cost function, the k_factor values of the distance formula described above are changed. In the preferred embodiment of the present invention, the edge block location and associated cost function are calculated for three separate iterations using three different k_factor values wherein the first k_factor value is 2.5, the second k_factor value is 3, and the last k_factor value is 4.

After the iterations are complete, the edge block locations and associated cost functions for the different k factors are analyzed to find the best possible edge block location (the block location having the highest confidence level) at step S12. Utilizing the block having the best possible edge location, step S13 finds the physical edge of the document in the edge block utilizing a derivative method in two dimensional space.

The determination of the best possible edge block considers whether any of the three blocks agree and compares their associated cost functions. If two or more blocks locations agree, this block location is chosen as the best possible edge block location and the associated cost function is reduced or the confidence factor is increased. The chosen best possible edge block is further analyzed to detect whether there are any black pixels within the chosen block. Depending on whether any black pixels are found or whether the associated cost function is greater than a predetermined value, the chosen best possible edge block is maintained as the chosen edge block or the process indicates that there has been failure in detecting the edge of the document.

Prior to step 13, the edge location is found within the block 21 of FIG. 2. At step S13, the actual edge is determined by utilizing three pixel blocks; the chosen best possible edge block and the two adjacent blocks. These three blocks are analyzed utilizing a derivative method to determine which pixel location is the actual location of the physical edge of the document.

A software implementation example of the above described method is set forth in Table 1 below. This table sets forth an example of software code which carries out the functions described above to find the edges of a document using second statistics. Although the process of the present invention has been implemented in software, it can also be readily implemented in hardware.

Figure 13:
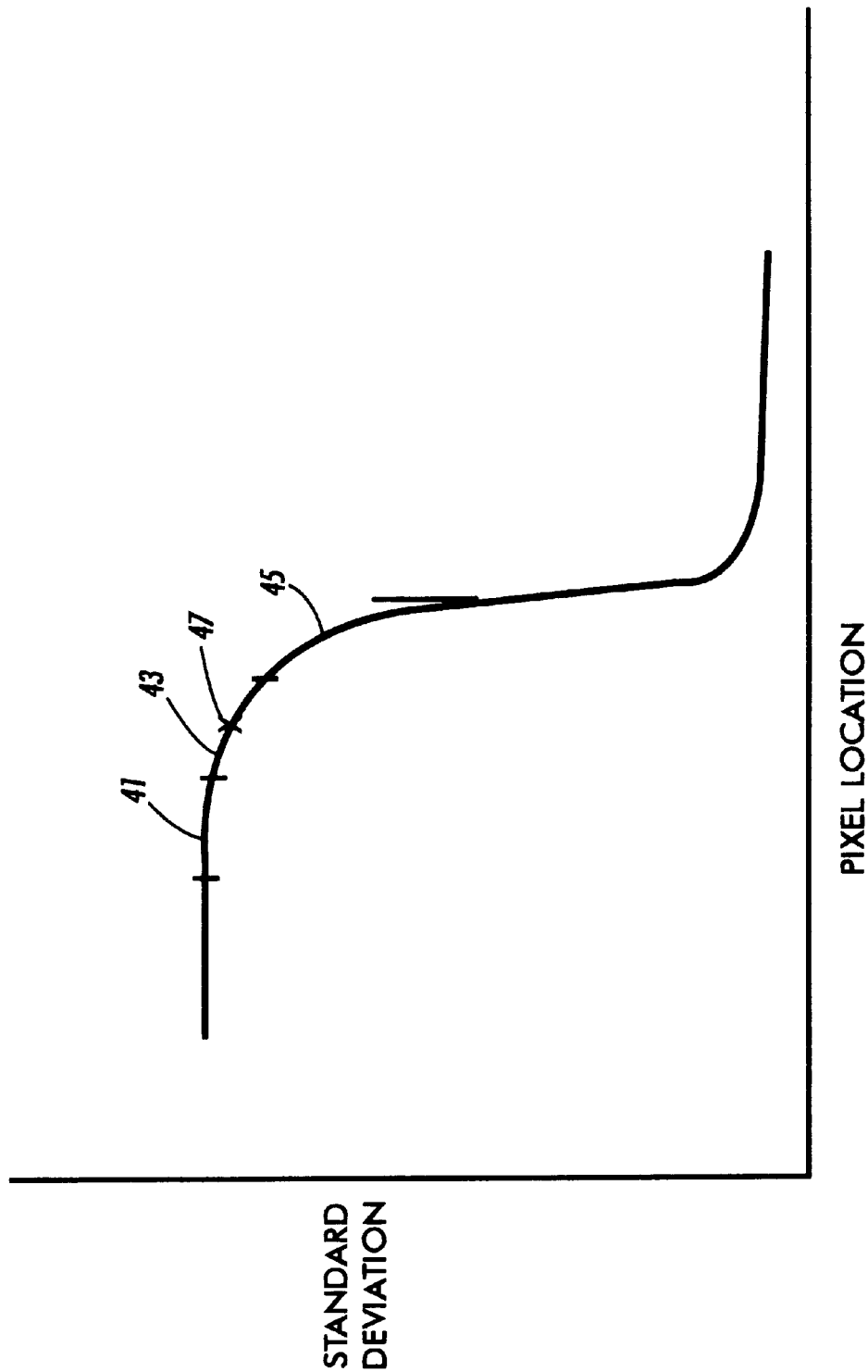
FIG. 13 is a graph illustrating the transition between the backing and a document's edge after a edge block has been determined according to the concepts of the present invention.

FIG. 13 illustrates a possible example of this analysis wherein block 43 represents the best possible edge block and blocks 41 and 45 represent the adjacent blocks to the best possible edge block. The data in blocks 41, 43, and 45 are analyzed utilizing a derivative method until the pixel location 47 of the actual edge of the document is determined.

FIG. 7 is a graphical representation of the calculation of a cluster center or a backing value and the spread for a backing as well as the cluster center and spread values for a film document and a bond paper document. It is noted that cluster centers can move in response to the scanning across the image as well as from scan to scan. Although the data reflected in FIG. 7 appears roughly elliptical, this data becomes spherical around the point (locmean, locstd) when the data is normalized with respect to the standard deviation of the mean and the standard deviation of the standard deviation. An example of this normalized data is illustrated in FIG. 8.

Figure 8:
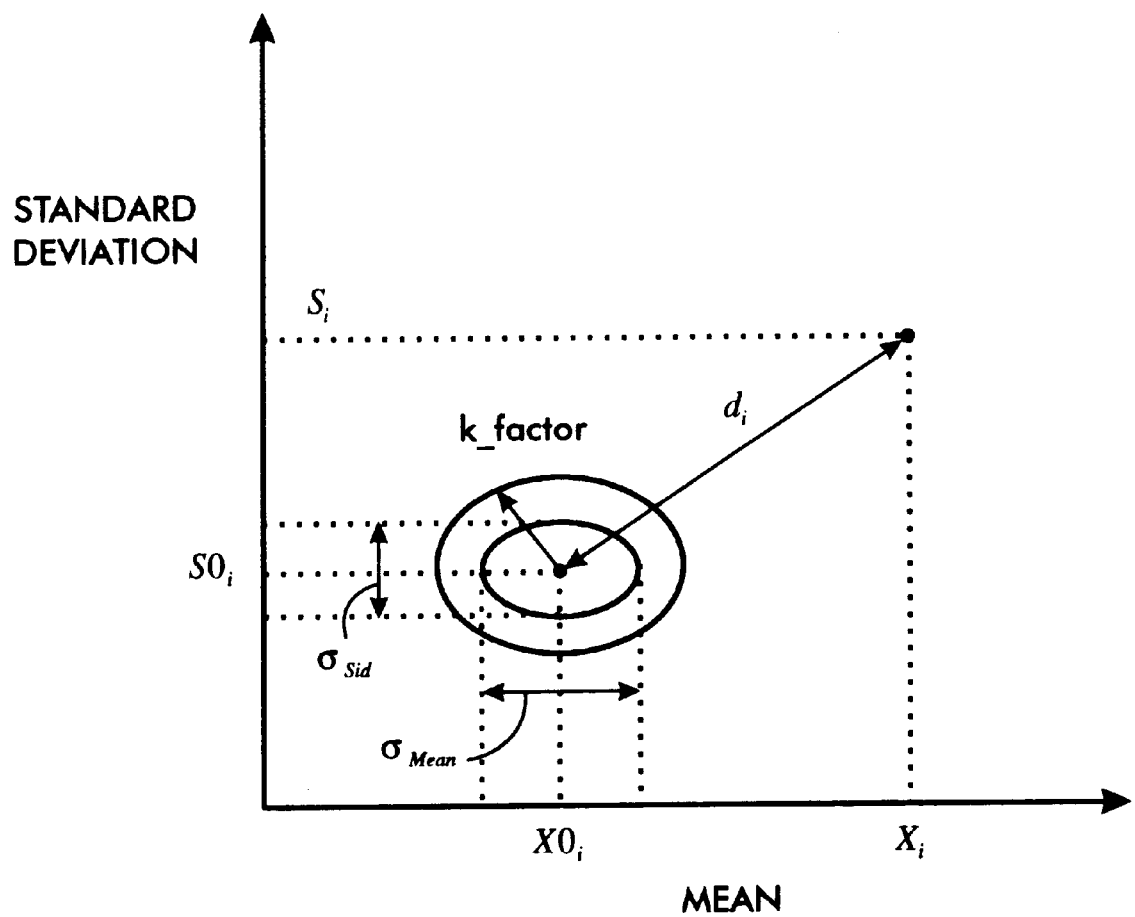
FIG. 8 is a graphical representation of a distance measurement in feature space according to the concepts of the present invention.

As illustrated in FIG. 8, the center point of the sphere is $(XO_i, SO_i)$ wherein $XO_i$ is the mean of the means of the previously analyzed blocks and $SO_i$ is the mean of the standard deviations of the previously analyzed blocks. Moreover, the spread of this data is equal to the standard deviation of the means of the previously analyzed blocks and the standard deviation of the standard deviations of the previously analyzed blocks. FIG. 8 also illustrates how the changing of the k factor in the distance formula changes the effect of the spread on the distance calculation.

As noted above, in determining whether a block would be chosen as the edge block location, the distance between the cluster center and a point represented by the coordinate (avgmean, avgstd), representing the present block being analyzed, is calculated. The greater the distance value, the more likely that the block contains document.

More specifically, the distance to probability relationship is clearly seen in FIGS. 3–6 wherein the transition points between the backing and the document cause jumps in the data thus indicating a significant distance between the mean and standard deviation of the block being analyzed and the mean of the means of the previously analyzed blocks and the mean of the standard deviations of the previously analyzed blocks.

When an edge is encountered, avgmean and avgstd will jump in value. The statistics locmean and locstd lag the rest, causing $d_i$ to increase suddenly. However, there may be false alarms. This is handled as follows.

Each scan of X (mean) and S (standard deviation) marks a status array with 0, 1, or 2 depending on whether d is less than or equal to a k_factor, greater than the k_factor or much greater than the k_factor, the k_factor being equal to k above in the distance equation. A zero (0) indicates 'backing', 1 means 'probably in the document' and 2 means 'definitely in the document'. For the first scan, k_factor is set small, in the preferred embodiment 2.5, and then progressively larger on each scan (3 and 4 in the preferred embodiment). After the each scan, a status array contains values 0, 1, or 2. The status array is updated using the cost of misclassification (i.e., cost of type I or II errors) to yield edge candidates.

For example if x be such that status[x]=1 or 2, the cost associated with deciding that an edge is at x is computed as the sum of status[i], i<x, plus the count of 0's in status[i], i>x. The minimum cost position is the edge candidate. This is stored along with its misclassification cost.

In the preferred embodiment, after three scans with increasing k_factor, three edge candidates plus their misclassification costs are produced. These three candidates are analyzed to create a single edge estimate and cost. These costs are converted into confidence coefficients 0, 1, or 2 which have the same meaning as before. The same procedure is used to estimate the both edges, just the scanning process going in opposite directions. This procedure estimates the edge to within 5 pixels in the preferred embodiment since a block consists of 5 pixel columns. The best (lowest cost) candidate is chosen to further pinpoint the edge.

To find the exact edge, the process uses the selected block and the two adjacent blocks to the left and right. This data is then re-configured, in the preferred embodiment into blocks of 3 pixel columns and the means and standard deviations are computed column-wise, yielding means $mX_i$, $mS_i$ and standard deviations $sX_i$, $sS_i$, i=1, . . . ,BLOCK_SIZE. These values are used in a distance calculation similar to the one described above:

$$D_i = sqrt([(mX_{i+1}-mX_i)/MEANTOL]^2 + [(sX_{i+1}-sX_i)/STDTOL]^2)$$

wherein MEANTOL and STDTOL are preset values. The biggest jump of $D_i$ is used to estimate the edge within three pixels. Finally, the edge position is found by interpolating neighboring values. This step counteracts the effect of edge shadows produced by the integrating cavity effect.

Figure 10:
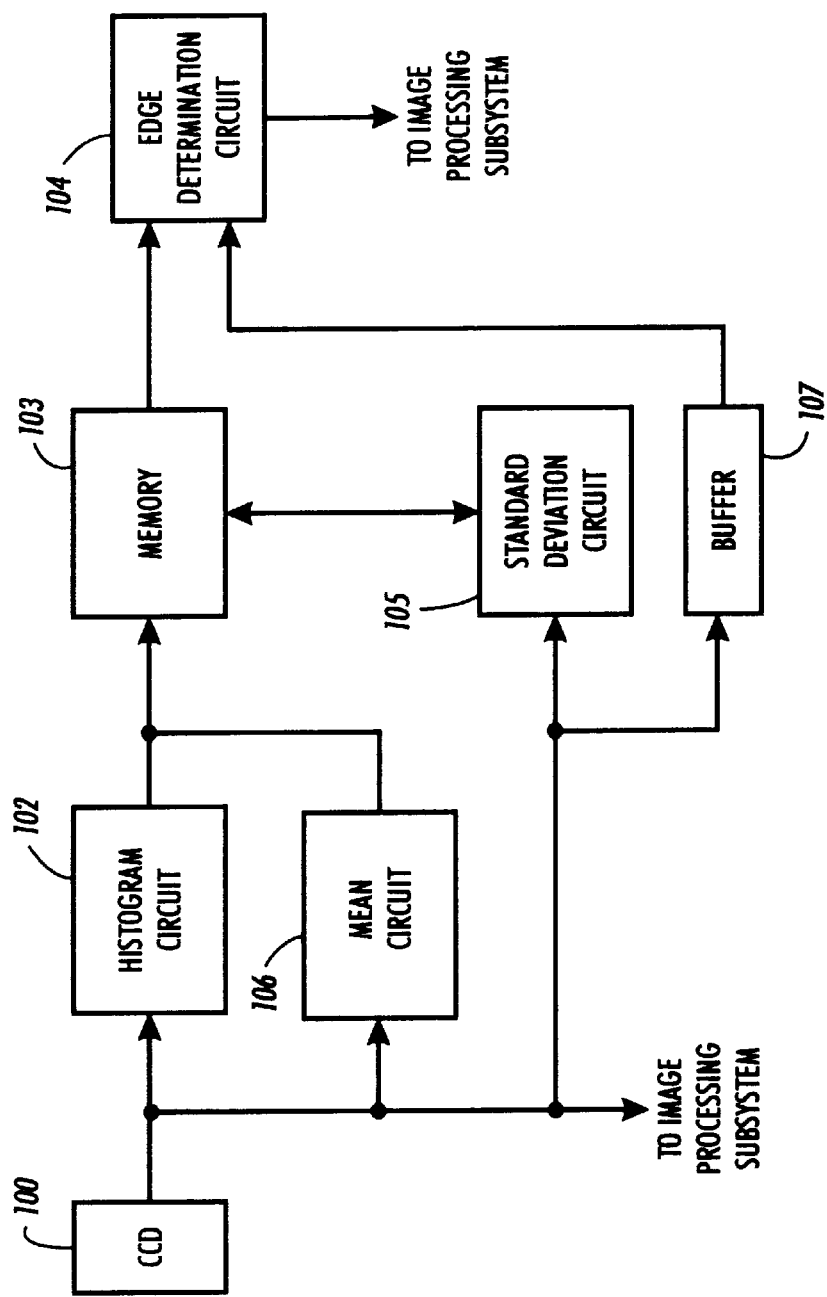
FIG. 10 is a block diagram showing a system for automatically detecting a width and position of a document according to the concepts of the present invention.

FIG. 10 illustrates a block diagram of a circuit which is utilized to determine the edge location of the document to be scanned. As illustrated in FIG. 10, a CCD sensor array 100 produces image data which is fed into a histogram circuit 102, a mean calculation circuit 106, a standard deviation calculation circuit 105, and a buffer 107. The histogram circuit 102 determines the histogram of the image data as well as calculates the background values discussed above. These background values are then fed to memory 103 to be stored temporarily for further processing.

The mean calculating circuit 106 calculates the mean value for each column of pixels, as well as the other mean calculations discussed above, and sends the mean values to the memory 103. The standard deviation calculating circuit 105 receives the image data as well as mean data from memory 103 to determine the standard deviation, as well as the other standard deviation calculations discussed above, of the data for each column and sends the standard deviation values to the memory 103. An image determination circuit 104 which carries out the precise processes described above, is connected to memory 103 and buffer 107 so as to receive the proper data needed to calculate the physical edge of the document to be scanned.

As described above, the second order statistics (standard deviation $S_i$) are used in addition to the mean to determine the document's edges. This utilization of second order statistics provide a more reliable process for detecting the edges and which is not sensitive to sensor electronic noise or dust and/or dirt.

Although the present invention has been described in detail above, various modifications can be implemented without departing from the spirit of the present invention. For example, the preferred embodiment of the present invention has been described with respect to a CCD sensor array; however, this auto-width detection method is readily implemented with a full width array scanning system. Moreover, the auto-width detection method of the present invention can be readily implemented on an ASIC, programmable gate array, or in software, thereby enabling the placement of this process in a scanner, electronic subsystem, printer, or display device.

Lastly, the present invention has been described with respect to a monochrome or black/white environment. However, the concepts of the present invention are readily applicable to a color environment. Namely, auto-width detection process of the present invention can be applied to each color space value representing the color pixel.

While the present invention has been described with reference to various embodiments disclosed herein before, it is not to be combined to the detail set forth above, but is intended to cover such modifications or changes as made within the scope of the attached claims.

New Patent Application
Attorney Docket Number: D/97097

Table 1

```
     NOTICE:  Copyright 1996, Xerox Corporation
              All Rights Reserved
           *
           *     Contains proprietary information of
           *     Xerox Corporation and is protected under the copyright
           *     laws as an unpublished work.
           *
           *
           * DESCRIPTION: Algorithm to implement width detection based upon the
           *             lead edge histogram.
           *
           *
           *
           *     AutoWidth()   - Finds the left and right edge of a document
           *     cobrscan_reset_iq_data - resets values after a normalization
           *                  j   command has been issued.
20         *
           *
     ********1*********2*********3*********4*********5*********6*********7*********/

/*-----------------------------------------------------------------*
25    *                        Include Files                   *
      *-----------------------------------------------------------------*/
     #include <math.h> ifndef _MCC960
     #include <stdio.h>
     #include <stdlib.h>
     #else
     #include "..\h\cobrscan.h"
     #include "opsuser.h"
     #include "heapman.h"
     #endif
```

New Patent Application
Attorney Docket Number: D/97097

```
#include "image.h"

/*------------------------------------------------------------------*
 *                  Imported Data Declarations                      *
 *------------------------------------------------------------------*/

/*------------------------------------------------------------------*
 *                  Imported Function Prototypes                    *
 *------------------------------------------------------------------*/

/*------------------------------------------------------------------*
 *                  Exported Data Declarations                      *
 *------------------------------------------------------------------*/

/*------------------------------------------------------------------*
 *                  Module Private Data Declarations                *
 *------------------------------------------------------------------*/
#if DBGFLAG == 1
  #define TRUE 1
  #define FALSE 0
#endif
#define COLSIZE 5
#define STDTOL 30
#define MEANTOL 80
#define STDTHD 110
define MEANTHD 2400 define LEFTEDGE 1
define RIGHTEDGE -1
#define DISTHD 10
#define DISTTOL 2
#define MINDOCSIZE 400
#define NBLOCK 360
#define STEPSIZE 5
#define LUTSIZE 256
#define STARTROW 8
```

New Patent Application
Attorney Docket Number: D/97097

```
     #define ENDROW LEADEDGE_LENGTH - 1
     #define ITERATION 3
     #define COSTTOL 3
     #define IITWEIGHT 25
     #define BLACK 120 static int SetupLutStatus = 0;
     static long SqreVal[LUTSIZE];
     static long SqrtVal[LUTSIZE];
     static int StdTol, MeanTol;
     static int LocMean, LocStd;

static AutoWidthData WidthData;
     static long LeftMean = MEANTHD;
     static long RightMean = MEANTHD;
     static long LeftStd = STDTHD;
     static long RightStd = STDTHD;
     static int BlackVal;

/*----------------------------------------------------------------------*
     *           Module Private Function Prototypes             *
     *----------------------------------------------------------------------*/
     static int findEdge( unsigned char *leadedge,int *left,int *right,
                              histParams *hisdata,int edge
     #if DBGFLAG == 1
         , FILE *fp
     #endif
     );

static int
         hist_bfr[256];

     static int GetStats(unsigned char *leadedge,int position,
                     long *NewMean, long *NewStd, int Col);
     static int
     GetColStats(unsigned char *leadedge,int position, long *NewMean, long
     *NewStd);
```

New Patent Application
Attorney Docket Number: D/97097

```
     static int SetupSqrtLut(void)
     {
         int loop = 0,dx = 0;
         int LutSize = LUTSIZE;
         int tmpval = 0;

for(loop = 0; loop < LutSize; loop ++)
         {
             if(tmpval < 80)
                 dx = 5;
             else if(tmpval < 200)
                 dx = 2;
             else if(tmpval < 300)
                 dx = 5;
             else if(tmpval < 1000)
                 dx = 10;
             else
                 dx = 20;
             SqrtVal[loop] = tmpval;
             SqreVal[loop] = tmpval * tmpval;
             tmpval += dx;
         }
         return 1;
     } static long SQRE(long data)
     {
         return(data * data);
     } static long SQRT(long data)
     {
         int guess = 50;
         int left = 0 ,right = LUTSIZE - 1;
     #if  DBGFLAG ==1
         FILE *fp = stdout;
     #endif
```

-25-

New Patent Application
Attorney Docket Number: D/97097

```
        if(data < 0)
        {
                DBGLOG1("SQRT negative # data = %d",data);
                return 1;
        }
        if(data > SqreVal[right])
        {
                DBGLOG1(" Warning: SQRT overflow, data=%d",data);
                return SqrtVal[right];
        }
        else
        {
                while ((right - left) > 1)
                {
                        if(data > SqreVal[guess])
                                left = guess;
                        else if(data == SqreVal[guess])
                                return SqrtVal[guess];
                        else
                                right = guess;
                        guess = (right + left) / 2;
                }
        }
        return ((SqrtVal[left] + SqrtVal[right])/2);
}

/******************************************************************************
 *
 * FUNCTION:    AutoWidth()
 *
 *
 * DESCRIPTION:    Determine the position of the document in the scanner from
 *                the leadedge grayscale data.
 *
 *
 * INPUTS:
```

New Patent Application
Attorney Docket Number: D/97097

```
    *          unsigned char *
    *                  leadedge - 36" by 0.7" of 8-bit gray scale data, at
    *                          100 dpi.
    *
    * OUTPUTS:
    *          int *
    *                  docStart - left edge position
    *
    *          int *
    *                  docEnd   - right edge position
    *
    *          int *
    *                  calibration_ok - indicates whether the average
    *                          background gray level is within range for
    *                          performing autowidth sensing and autoexposure
    *
    * LIMITATIONS:
    *
    * NOTES:
    *
    * HISTORY:   Created by Xiao-Fan Feng 10/96
    *
    *      11/26/96 EMM - Added standard headers, removed variables which weren't
    *                  being used; made static functions static.
    *      02/06/97 EMM - Change calibration_ok declaration to be int *, since
    *                  it is a returned value
    ***********************************************************************/
    int
    AutoWidth( unsigned char *leadedge, int *docStart, int *docEnd,
            int *calibration_ok
    #if DBGFLAG == 1
            , FILE *fp
    #endif
    )
    {
            int right,left, center = FULL_WIDTH/2;
            int status = 1, loop, WhitePeak;
            int DistLft,DistRgt, disthd;
```

New Patent Application
Attorney Docket Number: D/97097

```
            histParams histData;
            int count;
            long MeanSum,MeanSum2;
            long StdSum, StdSum2;
            long NewMean,NewStd;
            float tmpf1, tmpf2;
            int LeftStatus,RightStatus;
            int nBlack;
            int Wstd=2;
            if(SetupLutStatus == 0)
            {
                    count = SetupSqrtLut();
                    SetupLutStatus = 1;
            }
     /*
            printf("Sqrtval = %d SqrtVal = %d count = %d \n",SqrtVal[LUTSIZE-
     1],SqreVal[LUTSIZE-1],count);
            for(count = 0 ; count < 10; count++)
            {
            printf("input a number\n");
            scanf("%d",&loop);
            printf("sqrt[%d] = %d\n",loop,SQRT(loop));

            }
            exit(-1);
     */
            histData.hist = &hist_bfr[0];

            left = center - 200;       /* Center of the document */
            right = center + 200;
            WidthData.left = (FULL_WIDTH - MINDOCSIZE) / 2;
            WidthData.right = (FULL_WIDTH + MINDOCSIZE) / 2;

            /* get the histogram of the lead edge */
            if(GetHistogram(leadedge, left, right, &histData)== FAILURE)
                    return FAILURE;
            /* calculate the white threshold of the bkg */
            GetWhite(&histData);
```

-28-

New Patent Application
Attorney Docket Number: D/97097

```
        WhitePeak = histData.whitepeak * 10;
        WidthData.WhitePeak = histData.whitepeak;
        WidthData.PWratio = histData.PWratio;

if(((histData.whitethd - histData.blackthd) > histData.whitepeak/2) &&
                    (histData.PWratio > 5))
                BlackVal = histData.blackthd + (histData.whitethd -
histData.blackthd) / 3;
        else if(histData.PWratio < 5)
                BlackVal = histData.max / 3;
        else
                BlackVal = histData.whitepeak * 2 / 5;

DBGLOG1("Black Level = %d",BlackVal);

if((histData.whitepeak < 220) && (histData.PWratio > 5)) /* dark
substrate */
                Wstd = 4;
        else
                Wstd = 2;

/* finding the left edge */
        left = 1;
        count = 0;
        MeanSum = 0; MeanSum2 = 0;
        StdSum = 0; StdSum2 = 0;

if((histData.PWratio > 5) || (histData.max < 150))
        {
                if(WhitePeak > 2240)
                        disthd = (10*SQRE(abs(WhitePeak -
MEANTHD)))/SQRE(3*MEANTOL);
                else
                        disthd = (10*abs(WhitePeak -
MEANTHD))/(3*MEANTOL);
        }
        else
                disthd = 5;
```

New Patent Application
Attorney Docket Number: D/97097

```
            disthd += DISTHD;
            if(disthd < 12)
                    disthd = 12;
            DBGLOG1("DISTHD = %d",disthd);
            nBlack = 0;
            for(loop = 0;loop < 4; loop++)
            {
                    GetStats(leadedge, left, &NewMean, &NewStd, 3);
                    DBGLOG3("pos=%d mean= %d std = %d",left,NewMean,
     NewStd);

MeanSum += NewMean; MeanSum2 += NewMean*NewMean;
                    StdSum += NewStd;   StdSum2 += NewStd * NewStd;
                    count ++;
                    left += 2;
            }

LocMean = MeanSum / count;
            LocStd = StdSum / count;
            tmpf1 = (float)MeanSum / count;
            tmpf2 = (float)StdSum / count;

DistLft = SQRT(SQRE((LocMean - LeftMean)*200 / (3*MEANTOL)) +
                            SQRE(100*(STDTHD - LocStd) /
     (Wstd*STDTOL)))/10;

DBGLOG4("%d\t %d\t %d\t %d",left,DistLft,LocMean,LocStd);

            if((abs(LocMean - WhitePeak ) < (2*MEANTOL)) && (WhitePeak <
     (MEANTHD - MEANTOL)) &&
                      (LocMean < (MEANTHD - MEANTOL)))
                    DistLft = 3*DistLft / 2;

            /* Find the right edge        */

MeanTol = SQRT((int)(100.0*MeanSum2/(count) -
                                        (100*tmpf1*tmpf1))+1)/10 +
     MEANTOL/4;
```

-30-

New Patent Application
Attorney Docket Number: D/97097

```
            if(MeanTol > MEANTOL/2)
                    MeanTol = MEANTOL / 4;    /* in case hit the doc boundary */
            StdTol = SQRT((int)(100.0*StdSum2/(count) -
                                    (100*tmpf2*tmpf2))+1)/10 + STDTOL/4;
 5          if(StdTol > STDTOL * 10)
                    StdTol = 10*STDTOL;
            DBGLOG2("MeanTol = %d, StdTol=%d",MeanTol, StdTol);
            if(LocMean > 2000 && LocStd < 1000)
            {
                    left = COLSIZE; center = FULL_WIDTH / 2;
                    LeftStatus =
            findEdge(leadedge,&left,&center,&histData,LEFTEDGE
                    #if DBGFLAG == 1
                            ,fp
                    #endif
                    );
            }
            else
            {
                    left = 0;
                    LeftStatus = 2;
            }

/* Right edge */
            right = FULL_WIDTH - 2;
            count = 0;
            MeanSum = 0; MeanSum2 = 0;
            StdSum = 0; StdSum2 = 0;

            for(loop = 0;loop < 4; loop++)
            {
                    GetStats(leadedge, right, &NewMean, &NewStd, 3);
                    DBGLOG3("posi=%d mean= %d std = %d",right,NewMean,
            NewStd);
                    MeanSum += NewMean; MeanSum2 += NewMean*NewMean;
                    StdSum += NewStd;    StdSum2 += NewStd * NewStd;
                    count ++;
                    right -= 2;
            }
```

New Patent Application
Attorney Docket Number: D/97097

```
        LocMean = MeanSum / count;
        LocStd = StdSum / count;
        tmpf1 = (float)MeanSum / count;
        tmpf2 = (float)StdSum / count;

DistRgt = SQRT(SQRE((LocMean - RightMean)*200 / (3*MEANTOL))
     +
                    SQRE(100*(STDTHD - LocStd) /
        (Wstd*STDTOL)))/10;

DBGLOG4("%d\t %d\t %d\t %d",right,DistRgt,LocMean,LocStd);

if((abs(LocMean - WhitePeak) < (2*MEANTOL)) && (WhitePeak <
        (MEANTHD - MEANTOL)) &&
                    (LocMean < (MEANTHD - MEANTOL)))
            DistRgt = DistRgt *3 / 2;

/* find the right edge */
        MeanTol = SQRT((int)(100.0*MeanSum2/(count) -
                            (100*tmpf1*tmpf1))+1)/10 +
        MEANTOL/4;
            if(MeanTol > MEANTOL/2)
                MeanTol = MEANTOL / 4;    /* in case hit the doc boundary */
 25
            StdTol = SQRT((int)(100.0*StdSum2/(count) -
                            (100*tmpf2*tmpf2))+1)/10 + STDTOL/4;
            if(StdTol > STDTOL * 10)
                StdTol = 10*STDTOL;
            DBGLOG2("MeanTol = %d, StdTol=%d",MeanTol, StdTol);
            if(LocMean > 2000 && LocStd < 1000)
            {
                center = FULL_WIDTH / 2; right = FULL_WIDTH - COLSIZE;
                RightStatus =
        findEdge(leadedge,&center,&right,&histData,RIGHTEDGE
                    #if DBGFLAG == 1
                    ,fp
                    #endif
                    );
```

New Patent Application
Attorney Docket Number: D/97097

```
        }
        else
        {
            right = FULL_WIDTH - 1;
            RightStatus = 2;
        }

DBGLOG4("Doc Pos: %d %d EndThd: %d %d",left, right, DistLft,
DistRgt);

if(((RightStatus > 0) || (LeftStatus > 0)) &&
            ((DistLft < disthd + DISTTOL) ||((LeftStatus==2)&&(left>50)))&&
            (abs(left - FULL_WIDTH + right) < 200) &&
            ((DistRgt < disthd + DISTTOL)
||(RightStatus==2)&&(right<FULL_WIDTH-50)))
        {
            *docStart = left;
            *docEnd = right;
            LeftStatus = 1;
            RightStatus = 1;
        }
        /* first check if it is close to 36", 75 is used so that 34" will not be
        confused with 36" */
        else if((DistLft > (DISTHD + DISTTOL)||(left < 75 && LeftStatus > 0))
&&
            (DistRgt > (DISTHD+DISTTOL)||(right>(FULL_WIDTH-
75)&&RightStatus>0))&&
            (DistLft > disthd || DistRgt > disthd))
        {
            *docStart = 0;
            *docEnd = FULL_WIDTH - 1;
            DBGLOG("Document covers both ends");
            LeftStatus = 1;
            RightStatus = 1;
        }
        else
        {
            if((DistLft > disthd) || ((DistLft > DISTHD + DISTTOL) &&
(LeftStatus ==0)))
```

New Patent Application
Attorney Docket Number: D/97097

```
            {
                    *docStart = 0;
                    LeftStatus = 1;
                    DBGLOG1("Document covers left end dist = %d",DistLft);
            }
            else
                    *docStart = left;

if((DistRgt > disthd) ||((DistRgt > DISTHD + DISTTOL) &&
    (RightStatus == 0)))
            {
                    *docEnd = FULL_WIDTH - 1;
                    RightStatus = 1;
                    DBGLOG1("Document covers right end dist =
    %d",DistRgt);
            }
            else
                    *docEnd = right;
    } if(LeftStatus)
    {
            DBGLOG1("Find left edge at %d",*docStart);
    }
    else
    {
            DBGLOG("Failed left edge");
    } if(RightStatus)
    {
            DBGLOG1("Find right edge at %d",*docEnd);
    }
    else
    {
            DBGLOG("Failed Right edge");
    }
```

New Patent Application
Attorney Docket Number: D/97097

```
        DBGLOG4("Left %d %d Right %d %d",LeftMean, LeftStd, RightMean,
RightStd);
        if((abs(LeftMean - MEANTHD) > 3*MEANTOL/2) ||
                (abs(RightMean - MEANTHD) > 3*MEANTOL/2))
        {
                *calibration_ok = FALSE;
                DBGLOG("Scanner needs calibration");
        }
        else
                *calibration_ok = TRUE;
    DBGLOG1("Calibration = %d",*calibration_ok);

WidthData.LeftMean = LeftMean / 10;    /* divided by 10 */
        WidthData.RightMean = RightMean / 10;

if(*docStart < 0 || *docStart > FULL_WIDTH/2)
        {
                DBGLOG1("Left edge out of range docStart=%d",*docStart);
                *docStart = 0;
                LeftStatus = 0;
        }
        if(*docEnd > FULL_WIDTH || *docEnd < FULL_WIDTH/2)
        {
                DBGLOG1("Right edge out of range docStart=%d",*docStart);
                *docEnd = 0;
                RightStatus = 0;
        } return(LeftStatus && RightStatus);
}

/******************************************************************************
 *
 * FUNCTION:    findEdge()
 *
 *
 * DESCRIPTION:    Find the edge of document
 *
```

New Patent Application
Attorney Docket Number: D/97097

```
*
* INPUTS:        leadedge buffer, range and left or right
*
* OUTPUTS:       edge position
*
* LIMITATIONS:
*
* NOTES:
*
* HISTORY:       Created by Xiao-Fan Feng 10/96
*
*     11/26/96 EMM - Added standard header
*
****************************************************************/
static int
findEdge( unsigned char *leadedge,int *left,int *right,
          histParams *histData, int edge
#if DBGFLAG == 1
        , FILE *fp
#endif
)
{
        static int status[NBLOCK+1];
        static int cost[NBLOCK+1];
        static long Mean[NBLOCK + 1];
        static long Std[NBLOCK + 1];

long NewMean, NewStd, step;
        int index[ITERATION],min[ITERATION];
        int loop = 0, loop1,loop2;
        int position, position0;
        int Wmean, Wstd;
        int MeanTol0 = MEANTOL /4, StdTol0 = STDTOL / 3;
        int MeanDist,StdDist, dist=0;
        int StdStd, MeanStd;
        int whitepeak = histData->whitepeak;
        long OldMean, OldStd;
        long k_factor, Minimum = 0, EdgeIndex, EdgeIndex0;
        long Mean0, Std0, MeanStd0, StdStd0;
```

-36-

New Patent Application
Attorney Docket Number: D/97097

```
        int WidthStatus = 1,ChangeFlag = 0;
        long MeanSum, MeanSum2;
        float tmpfloat;
        int nBlack = 0, BlackPos, CumStatus;
        DBGLOG2(" Bkg Max = %d Bkg peak = %d ", histData-
    >max,whitepeak);
        if(((histData->max < 200)|| (whitepeak < 180)) &&
            ((histData->PWratio > 7)||(whitepeak < 80)))        /*
    dark substrate */
        {
            Wmean = 75;
            MeanTol0 = MEANTOL / 4;
            Wstd = 85;
            DBGLOG("Dark substrate");
        }
        else if(whitepeak > (MEANTHD - MEANTOL)/10)    /* Bond paper */
        {
            Wmean = 90;
            Wstd = 85;
            DBGLOG("Bond paper");
        }
        else if(whitepeak > 200)      /* film */
        {
            Wmean = 90;
            Wstd = 90;
            DBGLOG("Film ");
        }
        else
        {
            Wmean = 75;
            Wstd = 90;
            DBGLOG("Others ");
        }
        if(edge == RIGHTEDGE)
            position0 = *right;
        else
            position0 = *left;
```

-37-

New Patent Application
Attorney Docket Number: D/97097

```
              step = STEPSIZE;

Mean0 = 100 * LocMean; Std0 = 100 * LocStd;   /* mult by 100 */
              MeanStd0 = MeanTol * 100; StdStd0 = StdTol * 100;
              position = position0;
              nBlack = 0; BlackPos = NBLOCK;  CumStatus = 0;
              for (loop = 0; loop < NBLOCK; loop ++)
              {
                      nBlack +=
      GetStats(leadedge,position,&Mean[loop],&Std[loop],5);
                      if(nBlack > 5 && BlackPos == NBLOCK)
                      {
                              BlackPos = loop;
                              DBGLOG2("Found black at %d index=%d",
      position,BlackPos);
                              if(edge == LEFTEDGE)
      /*Guaranteed width for autoIQ */
                                      WidthData.left = position;
                              else
                                      WidthData.right = position;
                      }
                      position += edge * step;
              }
              for ( loop2 = 0; loop2 < ITERATION; loop2 ++)
              {
                position = position0;
                k_factor = 10 + loop2*10;
                if(loop2 == 0)
                        k_factor = 15;
                LocMean = Mean0;
                LocStd = Std0;
                StdStd = StdStd0;
                MeanStd = MeanStd0;
                MeanTol = MeanTol0 + k_factor * MeanStd/10;
                StdTol = StdTol0 + StdStd * k_factor/10;

for (loop = 0; loop < NBLOCK; loop ++)
                {
```

```
                    NewMean = Mean[loop]; NewStd = Std[loop];
                    MeanDist = SQRE((Mean[loop] * 10 - LocMean / 10)/
        (MeanTol+1));
                    if(MeanDist > 25500)
                        MeanDist = 25500;
        /*          if(Std[loop] * 100 < LocStd)    commented out 2/21/97 to
        prevent
                    StdDist = 0;                    scanner saturation
        caused std error
                    else
        */
                    StdDist = SQRE((Std[loop] * 10 - LocStd / 10) / (StdTol + 1));
                    if(StdDist > 25500)
                        StdDist = 25500;
                    dist = SQRT(50*(MeanDist + StdDist)) / 10;
                    if(dist >= DISTHD)
                    {
                        status[loop] = 1;
                        if((dist > 2*DISTHD) && (loop > 2))
                            status[loop] = 2;

CumStatus += status[loop];
                        if((loop >= BlackPos + 10))
                            {
                                for(loop1 = loop + 1; loop1 <= NBLOCK;
        loop1++)
                                    status[loop1] = 1;
                                loop = NBLOCK;
                            }
                    }
                    else
                        status[loop] = 0;
                    if(dist < (9*DISTHD / 10))
                    {
                        MeanStd = (MeanStd * Wmean + (100-
        Wmean)*abs(LocMean - 100*NewMean))/100;
                        StdStd = (StdStd * Wstd + (100-Wstd)*abs(LocStd -
        100*NewStd))/100;
```

New Patent Application
Attorney Docket Number: D/97097

```
                        LocMean = (LocMean * Wmean/100 + NewMean * (100 -
        Wmean));
                        LocStd = (LocStd * Wstd/100 + NewStd * (100 - Wstd));
                        MeanTol = MeanTol0 + k_factor * MeanStd / 1000;
                        StdTol = StdTol0 + k_factor * StdStd / 1000;
                }
        #if DBGFLAG == 1
                if(loop2 == 1)
                {
                    fprintf(fp,"%d\t %d\t %d\t %d\t ", position,
                        NewMean, NewStd, (LocMean/100));
                        fprintf(fp,"%d\t %d\t %d\t %d\t ",(LocStd/100 ),
                            (MeanDist), (StdDist), (MeanTol));
                        fprintf(fp,"%d\t %d\n", (StdTol), status[loop]);
                }
        #endif
                    position += edge * step;
                }

           /* Median filter the status data
            ChangeFlag = 0;
            for (loop = 1; loop < NBLOCK-1; loop ++)
            {
                if(((status[loop] ==1) && (status[loop+1]==0)&&(status[loop-
        1]==0))||
                    ((status[loop] ==0) && (status[loop+1]>0)&&(status[loop-
        1]>0)))
                {
                    if(ChangeFlag == 1)
                        status[loop - 1] = 1 - status[loop - 1];
                    ChangeFlag = 1;
                }
                else
                {
                    if(ChangeFlag == 1)
                        status[loop - 1] = 1 - status[loop - 1];
                    ChangeFlag = 0;
                }
            }
```

New Patent Application
Attorney Docket Number: D/97097

```
*/
for (loop = 0; loop < NBLOCK; loop ++)
{
    cost[loop] = 0;
        for (loop1 = 1; loop1 < NBLOCK - 1; loop1++)
        {
            if(loop1 <= loop)
                cost[loop] += status[loop1];
            if(loop1 > loop && status[loop1] == 0)
                cost[loop] ++;
        }
} index[loop2] = NBLOCK / 2; min[loop2] = 1200;
for (loop = 0; loop < NBLOCK - 1; loop ++)
{
    if(cost[loop] <= min[loop2])
    {
        min[loop2] = cost[loop];
        index[loop2] = loop;
    }
}

DBGLOG("Cost function");
for(loop2 = 0; loop2 < ITERATION; loop2++)
{
    DBGLOG3("%d\t %d\t %d", loop2,index[loop2],min[loop2]);
} if(abs(index[0] - index [1]) < 2)
{
    if(min[0] > 0 && min[1] >0)
        min[1] = (int) (1.0/(1.0/min[0] + 1.0/min[1]) + 0.5);
    else if(min[0] > 0 || min[1] >0)
        min[1] = 0;
    else
        min[1] = -1;
}
```

-41-

New Patent Application
Attorney Docket Number: D/97097

```
if(abs(index[2] - index [1]) < 2)
{
        if(min[2] > 0 && min[1] >0)
                min[1] = (int) (1.0/(1.0/min[2] + 1.0/min[1]) + 0.5);
        else if(min[0] > 0 || min[1] >0)
                min[1] = 0;
        else
                min[1] = -1;
}

Minimum = 1200;EdgeIndex = -1;
for(loop2 = 0; loop2 < ITERATION; loop2++)
{
        if(min[loop2] < Minimum &&
                (index[loop2] >= 0 && index[loop2] < (1800-200)/step ))
        {
                Minimum = min[loop2];
                EdgeIndex = index[loop2];
        }
}
if(Minimum > COSTTOL || EdgeIndex > BlackPos)
{
        DBGLOG("Edge detection failed");
        WidthStatus = 0;
}
else if((EdgeIndex < (BlackPos - 1)) && (Minimum <= 1))
        WidthStatus = 2;
else
        WidthStatus = 1;

EdgeIndex0 = EdgeIndex;

if(edge == LEFTEDGE)
        {
                *right = position0 + (EdgeIndex + 1) * step;
                *left = *right - step;
        }
        else
```

New Patent Application
Attorney Docket Number: D/97097

```
              {
                   *right = position0 - (EdgeIndex) * step;
                   *left = *right - step;
              }
         DBGLOG3("Find edge between %d and %d Width status = %d",
                   *left,*right, WidthStatus);

Minimum = 0;
         if(edge == LEFTEDGE)
                position0 = *left - step;
         else
                position0 = *right + step;

if(position0 < COLSIZE/2)
                position0 = COLSIZE/2;
         if(position0 > FULL_WIDTH-COLSIZE/2-1)
                position0 = FULL_WIDTH-COLSIZE/2-1;
         position = position0;

        BlackPos = 0;
         GetStats(leadedge,position,&OldMean,&OldStd,3);
         for (loop = 1; loop <=  STEPSIZE + 1; loop ++)
         {
                position += edge * 3;
                nBlack =
         GetStats(leadedge,(int)position,&NewMean,&NewStd,3);
                if(nBlack > 5 && BlackPos > 5)
                       BlackPos = position - 5*edge;

               status[loop] = SQRT(SQRE((NewMean -
         OldMean)*20/MEANTOL)
                              + SQRE((NewStd - OldStd)*10 / STDTOL));
                OldMean = NewMean; OldStd = NewStd;
                if(status[loop] >= Minimum)
                {
                       Minimum = status[loop];
                       EdgeIndex = loop;
                }
```

-43-

New Patent Application
Attorney Docket Number: D/97097

```
                DBGLOG4("%d\t %d\t %d\t %d", position, NewMean, NewStd,
        status[loop]);

if(Minimum > 2 * DISTHD)
                        break;
        }

*left = position0 + edge*(3 * EdgeIndex - 2);
        if(Minimum < 2*DISTHD && WidthStatus ==2) /* not a crisp edge, set
        status to 1 */
                WidthStatus = 1;

if((BlackPos > 0) && ((BlackPos > *left && edge ==RIGHTEDGE)||
                        (BlackPos < *left && edge ==
        LEFTEDGE)))
                *left = BlackPos;

if(*left < 0)
                *left = 0;
        if(*left > FULL_WIDTH -1)
                *left = FULL_WIDTH - 1;

*right = *left;

DBGLOG2("index = %d Edge position = %d" , EdgeIndex,*right);

if((WidthStatus == 2) && (EdgeIndex0 > 50))         /* Wide doc may
        affect statics */
        {
                MeanSum =0; MeanSum2 = 0;
                for(loop = 0; loop < EdgeIndex0 - 25; loop ++)
                {
                        MeanSum += Mean[loop];
                        MeanSum2 += Mean[loop]* Mean[loop];
                }
                tmpfloat = (float)MeanSum / ((float)EdgeIndex0 - 25);
                NewStd = SQRT((int)((100.0*MeanSum2/((float)EdgeIndex0 -
        25)) -
```

-44-

```
                100.0*tmpfloat*tmpfloat))/10;
            NewMean = (int) tmpfloat;
            if(abs(NewMean - MEANTHD) < 2*MEANTOL)
            {
                if(edge == LEFTEDGE)
                {
                    LeftMean = (LeftMean * (100 - IITWEIGHT) +
NewMean * IITWEIGHT)/100;
                    LeftStd = NewStd;
                }
                else
                {
                    RightMean = (RightMean * (100 - IITWEIGHT) +
NewMean * IITWEIGHT)/100;
                    RightStd = NewStd;
                }
            }
        }
        return WidthStatus;
    }

/****************************************************************************
 *
 * FUNCTION:    GetStats()
 *
 *
 * DESCRIPTION:
 *
 *
 * INPUTS:
 *
 * OUTPUTS:
 *
 * LIMITATIONS:
 *
 * NOTES:
 *
 * HISTORY:    Created by Xiao-Fan Feng 10/96
```

-45-

New Patent Application
Attorney Docket Number: D/97097

```
         *
         *     11/26/96 EMM - Added standard header
         **************************************************************************/
         static int
         GetStats(unsigned char *leadedge,int position, long *NewMean, long
         *NewStd,int Col)
         { int loop1, loop2, NumBlack = 0;
                 long mean[COLSIZE], std[COLSIZE];
                 long mean2 = 0, std2 = 0;
                 unsigned char *addr;
                 long tmp;
                 double tmpfloat;
                 int rows = ENDROW - STARTROW;
                 int max = 0, min = 10000;

if((position >= (FULL_WIDTH - Col/2)) || (position < Col/2))
                 {
                         *NewMean = MEANTHD;
                         *NewStd = STDTHD;
                         return 0;
                 }
                 position = position - Col/2;  /* centerized the window */
                 for(loop1 = 0; loop1 < Col; loop1 ++)
                 {
                         mean[loop1] = 0;
                         std[loop1] = 0;
                 }
                 for(loop2 = STARTROW; loop2 < ENDROW; loop2++)
                 {
                         addr = leadedge + loop2 * FULL_WIDTH + position;
                         for(loop1 = 0; loop1 < Col; loop1 ++)
                         {
                                 tmp = *(addr + loop1);
                                 mean[loop1] += tmp;
                                 std[loop1] += tmp*tmp;
                                 if(tmp < BlackVal)
```

-46-

New Patent Application
Attorney Docket Number: D/97097

```
                    NumBlack ++;
            }
    }

    for(loop1 = 0; loop1 < Col; loop1 ++)
    {
            tmpfloat = 10.0 * mean[loop1] / rows;   /* time 10 for accuracy */
            tmp = (int)(10000.0*std[loop1]/ rows - (100.0*tmpfloat * tmpfloat)
    + 0.5);
            if(tmp > 1000000)
                    tmp = 1000000;
            std[loop1]=SQRT(tmp);
            mean[loop1] = (int)(tmpfloat + 0.5);
            std2 += std[loop1];
            mean2 +=mean[loop1];
            if(std[loop1] > max)
                    max = std[loop1];
            if(std[loop1] < min)
                    min = std[loop1];
    }
    *NewMean = mean2 / Col;
    *NewStd = (std2 - max)/ (Col -1);   /* median filter */ return NumBlack;
    }

/****************************************************************/
    static int
30  GetColStats(unsigned char *leadedge,int position, long *NewMean, long
    *NewStd)
    { int loop2;
            long mean, std;
            unsigned char *addr;
            long tmp;
            double tmpfloat;
```

-47-

```
        if((position >= FULL_WIDTH) || (position < 0))
        {
                *NewMean = MEANTHD;
                *NewStd = STDTHD;
                return 0;
        } mean = 0;
        std = 0;

for(loop2 = 1; loop2 < LEADEDGE_LENGTH - 1; loop2++)
        {
                addr = leadedge + loop2 * FULL_WIDTH + position;
                tmp = *addr;
                mean += tmp;
                std += tmp*tmp;
        } tmpfloat = 10.0 * mean / (LEADEDGE_LENGTH - 2);  /* time 10 for accuracy */
        tmp = (int)(10000.0*std/ (LEADEDGE_LENGTH - 2) -
                                (100.0*tmpfloat * tmpfloat) + 0.5);
        std=SQRT(tmp);
        mean = (int)(tmpfloat + 0.5);

*NewStd = std; *NewMean = mean;

return 1;

}

/********************************************************************
 *
 * FUNCTION:    cobrscan_reset_iq_data()
 *
 *
```

New Patent Application
Attorney Docket Number: D/97097

```
 * DESCRIPTION:    This function MUST be called after issuing the
normalization
 *              command explicitly to the scanner.  It will reset the running
 *              values that AutoWidth() is maintaining, in order for us to
 *              notify the user that the scanner is out of calibration.
 *
 *
 * INPUTS: NONE.
 *
 * OUTPUTS:    NONE.
 *
 * LIMITATIONS:
 *
 * NOTES:
 *
 * HISTORY:    Created by EMM 01/17/97
 *
 *     xx/xx/xx xxx - <change_desc>
 *
 ************************************************************************/
void
cobrscan_reset_iq_data( void )
{
   LeftMean = MEANTHD;
      RightMean = MEANTHD;
}

/*************************************************************************
 *
 * FUNCTION:   GetAutoWidthData(AutoWidthData)
 *
 *
 * DESCRIPTION:    This function MUST be called to pass data from auto
width
 *                to Wings3ip routine
 *
 * INPUTS: NONE.
 *
```

-49-

New Patent Application
Attorney Docket Number: D/97097

```
 * OUTPUTS:    NONE.
 *
 * LIMITATIONS:
 *
 * NOTES:
 *
 * HISTORY:    Created by X. Feng 02/03/97
 *
 *      xx/xx/xx xxx - <change_desc>
 *
 ******************************************************************/
void
GetAutoWidthData(AutoWidthData *output)
{
        output->WhitePeak = WidthData.WhitePeak;
        output->LeftMean = WidthData.LeftMean;
        output->RightMean = WidthData.RightMean;
        output->left = WidthData.left;
        output->right = WidthData.right;
        output->PWratio = WidthData.PWratio;
}
```

What is claimed is:

1. A method for automatically detecting an edge of a document in a scanning system, comprising the steps of:
   (a) scanning a portion of the document;
   (b) generating pixels of image data representing an image density;
   (c) calculating a set of first values from the image data using a first function, said first function being a first order function;
   (d) calculating a set of second values from the image data using a second function, said second function being a second order function; and
   (e) determining a physical edge of the document from the set of first values and the set of second values.

2. The method as claimed in claim 1, wherein said step (e) comprises the substeps of:
   (e1) grouping first and second values located in a same column as a block;
   (e2) classifying each block;
   (e3) updating a cluster center value and a spread value when said substep (e2) classifies a block as backing;
   (e4) determining which blocks having a possible edge location; and
   (e5) calculating a confidence value for each block with a possible edge location.

3. The method as claimed in claim 2, further comprising the substeps of:
   (e6) repeating substeps (e1)–(e5) a predetermined number of times using a different weighting factor in said substep (e4); and
   (e7) determining which block has a highest confidence value.

4. The method as claimed in claim 3, further comprising the substep of:
   (e8) determining an actual physical location of document edge in the block determined by said substep (e6).

5. The method as claimed in claim 1, wherein the pixels of image data are grouped according to slowscan location;
   said step (c) calculates a mean value for each group of pixels; and
   said step (d) calculates a standard deviation for each group of pixels.

6. The method as claimed in claim 1, further comprising the step of:
   (f) determining a right edge distance and a left edge distance for the document.

7. A system for automatically detecting an edge of a document in a scanning system, comprising:
   a scanner to scan a portion of the document and to generate pixels of image data representing an image density;
   first means for calculating a set of first values from the image data using a first function, said first function being a first order function;
   second means for calculating a set of second values from the image data using a first function, said second function being a second order function; and
   third means for determining a physical edge of the document from the set of first values and the set of second values.

8. The system as claimed in claim 7, wherein said third means (a) grouping first and second values located in a same column as a block; (b) classifying each block; (c) updating a cluster center value and a spread value when a block is classified as backing; (d) determining which blocks having a possible edge location; and (e) calculating a confidence value for each block with a possible edge location.

9. The system as claimed in claim 8, said third means repeats (a)–(e) a predetermined number of times using a different weighting factor and determines which block has a highest confidence value from these iterations.

10. The system as claimed in claim 7, wherein the pixels of image data are grouped according to slowscan location;
    said first means calculates a mean value for each group of pixels; and
    said second means calculates a standard deviation for each group of pixels.

11. The system as claimed in claim 10, further comprising:
    fourth means for determining a set of black pixel count values.

12. The system as claimed in claim 11, wherein said third determines a physical edge of the document from the set of first values, the set of second values, and the set of black pixel count values.

* * * * *